US007970991B2

(12) United States Patent
Abe

(10) Patent No.: US 7,970,991 B2
(45) Date of Patent: Jun. 28, 2011

(54) STORAGE CONTROL APPARATUS AND STORAGE CONTROL METHOD

(75) Inventor: Tetsuya Abe, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 1259 days.

(21) Appl. No.: 11/583,572

(22) Filed: Oct. 18, 2006

(65) Prior Publication Data

US 2008/0049276 A1    Feb. 28, 2008

(30) Foreign Application Priority Data

Aug. 24, 2006  (JP) .................................. 2006-228226

(51) Int. Cl.
*G06F 12/00*  (2006.01)
(52) U.S. Cl. .................... 711/114; 711/151; 711/E12.07
(58) Field of Classification Search .................. 711/114, 711/151
See application file for complete search history.

(56) References Cited

U.S. PATENT DOCUMENTS

| 6,691,209 B1 * | 2/2004 | O'Connell ..................... 711/114 |
| 6,823,442 B1 * | 11/2004 | Cameron ....................... 711/220 |
| 2004/0068636 A1 | 4/2004 | Jacobson et al. |
| 2005/0091266 A1 | 4/2005 | Hasegawa |
| 2005/0278398 A1 | 12/2005 | Tokuda et al. |
| 2006/0074912 A1 | 4/2006 | Borthakur et al. |
| 2006/0075190 A1 | 4/2006 | Higaki et al. |
| 2006/0080365 A1 | 4/2006 | Glover et al. |
| 2006/0107017 A1 | 5/2006 | Serizawa et al. |

FOREIGN PATENT DOCUMENTS

| EP | 1462927 A2 | 9/2004 |
| JP | 2004-127301 A | 4/2004 |
| JP | 2005-011316 A | 1/2005 |
| JP | 2005-128771 A | 5/2005 |
| JP | 2006-106980 A | 4/2006 |
| WO | 2006037091 A2 | 4/2006 |

OTHER PUBLICATIONS

European Search Report corresponding to European Search Patent Application No. 07251360.9, dated Mar. 17, 2010.

\* cited by examiner

*Primary Examiner* — Reginald G Bragdon
*Assistant Examiner* — Hamdy S Ahmed
(74) *Attorney, Agent, or Firm* — Sughrue Mion, PLLC

(57) ABSTRACT

A storage control apparatus capable of rapidly carrying out data processing according to requests from upper order apparatus, and capable of rapidly returning the results of processing to the upper order apparatus is provided. A computer system comprised of upper order apparatus and storage control apparatus is disclosed. The upper order apparatus accesses a virtual volume. A pool volume is allocated to the virtual volume. The pool volume is provided with a storage region of storage discs. The pool volume classifies data sent from the upper order apparatus for every type into text data, block data, and large sized data. The storage control apparatus then recognizes the types of data and stores the data on respective volumes.

12 Claims, 31 Drawing Sheets

FIG.11

| HOST LOGICAL LU NUMBER | START ADDRESS | APPARATUS LOGICAL LU NUMBER | SIZE | START ADDRESS | Status1 | Status2 | Status3 |
|---|---|---|---|---|---|---|---|
| HLU-1 | 0x00000000000 | SLU-1 | 0F0 | 0x00000000000 | 01 | 01 | 01 |
| HLU-1 | 0x0000f0000 | SLU-4 | 0F0 | 0x0000f0000 | 01 | 01 | 01 |
| HLU-1 | 0x000f00000 | SLU-3 | 0F0 | 0x000f00000 | 01 | 01 | 01 |
| HLU-1 | 0x00100000 | SLU-5 | 0F0 | 0x00100000 | 01 | 01 | 01 |
| HLU-1 | 0x004f00000 | SLU-9 | 0F0 | 0x004f00000 | 02 | 01 | 01 |
| HLU-1 | 0x01000000 | SLU-10 | 0F0 | 0x01000000 | 01 | 02 | 01 |
| HLU-1 | 0x014f00000 | SLU-27 | 0F0 | 0x014f00000 | 01 | 01 | 01 |
| .. | .. | .. | .. | .. | .. | .. | .. |
| HLU-N | 0x00000000000 | SLU-50 | 10000 | 0x00000000000 | 03 | FF | 01 |
| HLU-N | 0x01000000 | SLU-50 | 30000 | 0x01000000 | FF | FF | 01 |
| HLU-N | 0x04000000 | SLU-50 | 60000 | 0x04000000 | FF | FF | 01 |
| HLU-N | 0x0a000000 | SLU-50 | 90000 | 0x0a000000 | FF | FF | 01 |

FIG.12

| APPARATUS LOGICAL LU NUMBER | POOL ATTRIBUTE | GROUP ATTRIBUTE | Status |
|---|---|---|---|
| SLU-1 | POOL 1 (ONLINE) | 01 | 01 |
| SLU-2 | POOL 2 (OFFLINE) | 02 | 01 |
| SLU-3 | POOL 1 (ONLINE) | 01 | 01 |
| SLU-4 | POOL 1 (ONLINE) | 03 | 01 |
| SLU-5 | POOL 1 (ONLINE) | 02 | 01 |
| SLU-6 | POOL 2 (OFFLINE) | 03 | 02 |
| SLU-7 | POOL 2 (OFFLINE) | 03 | 02 |
| ⋮ | ⋮ | ⋮ | ⋮ |
| SLU-N-2 | POOL 2 (OFFLINE) | FF | 02 |
| SLU-N-1 | POOL 2 (OFFLINE) | FF | 02 |
| SLU-N | POOL 2 (OFFLINE) | 03 | 02 |

FIG.13

| SLU NUMBER | REGION NUMBER | REGION (DATA BOUNDARY) | | Index | | | |
|---|---|---|---|---|---|---|---|
| | | START ADDRESS | REGION SIZE | Index1 | Index2 | Index3 | Index4 |
| SLU-1 | SG-0001 | 0x0000 | 008 | TB01-001 | TB01-003 | TB01-05 | - |
| | SG-0002 | 0x0010 | 008 | TB01-002 | - | - | - |
| | SG-0003 | 0x0020 | 008 | TB01-004 | TB01-005 | - | - |
| | SG-0004 | 0x0030 | 008 | TB02-001 | - | - | - |
| | SG-0005 | 0x0040 | 008 | TB02-002 | - | - | - |
| | SG-0006 | 0x0050 | 008 | TB02-003 | TB02-004 | - | - |
| | SG-0007 | 0x0060 | 008 | TB03-005 | - | - | - |
| | SG-0008 | 0x0070 | 008 | TB03-002 | - | - | - |
| | SG-0009 | 0x0080 | 008 | TB03-004 | - | - | - |
| | .. | .. | .. | .. | .. | .. | .. |
| | .. | .. | .. | .. | .. | .. | .. |
| | .. | .. | .. | .. | .. | .. | .. |
| | .. | .. | .. | .. | .. | .. | .. |

FIG.14

| TABLE NUMBER | Index NUMBER | Index DATA PATTERN (TEXT KEYWORD) |
|---|---|---|
| TB01 | 001 | SEARCH, INDEX |
| | 002 | OPERATION, SIMPLIFICATION, STORAGE |
| | 003 | STORAGE, HIGH SPEED, CALCULATIONS |
| | 004 | HIGH-SPEED SEARCH FUNCTION |
| | 005 | : |
| | 006 | : |
| | 007 | : |
| | 008 | : |

FIG.15

| TABLE NUMBER | Index NUMBER | Index DATA PATTERN SCRIPT NOTATION (DB KEYWORD, SEARCH WORD, SEARCH METHOD) |
|---|---|---|
| TB02 | 001 | Back* |
| | 002 | 80[23]?86 |
| | 003 | {filename = *COMPARISON*, .xls, COMPARISON CHART, 2006} |
| | 004 | {Database=revenue, RVN1=>80, Hitachi} |

FIG.16

| TABLE NUMBER | Index NUMBER | SIZE | Index DATA PATTERN |
|---|---|---|---|
| TB03 | 001 | 64KB | Bitmap pattern-1 |
| | 002 | 16KB | Bitmap pattern-2 |
| | 003 | 16KB | Bitmap pattern-3 |
| | 004 | 512KB | Bitmap pattern-4 |
| | 005 | 512KB | Bitmap pattern-5 |
| | 006 | 38KB | Bitmap pattern-6 |
| | 007 | 38KB | Bitmap pattern-7 |
| | 008 | 38KB | Bitmap pattern-8 |

FIG.21

| SEARCH HISTORY NUMBER | DATE | Index No. | HIT SG NUMBER | HIT No.(SLU#-SG#) |
|---|---|---|---|---|
| 0001 | 010407 | TB01-002 | 02 | SLU01-SG001, SLU02-SG009 |
| 0002 | 030109 | TB01-003 | 01 | SLU01-SG008 |
| 0003 | 030320 | TB05-009 | 03 | SLU05-SG005, SLU06-SG005, SLU06-SG006 |
| 0004 | 040320 | TB02-001 | 03 | SLU07-SG001, SLU07-SG002, SLU07-SG003 |
| 0005 | 050320 | TB05-009 | 05 | SLU03-SG001, SLU03-SG005, SLU03-SG006, SLU05-SG001, SLU05-SG002 |
| 0006 | 050511 | TB02-002 | 01 | SLU04-SG001 |
| 0007 | 050520 | TB02-003 | 02 | SLU01-SG010, SLU02-SG019 |
| 0008 | 050603 | TB03-004 | 02 | SLU02-SG011, SLU02-SG019 |
| 0009 | 050707 | TB03-004 | 05 04 | SLU03-SG003, SLU04-SG003, SLU05-SG003, SLU06-SG003, SLU07-SG003 |
| 0010 | 060305 | TB01-002 |  | SLU10-SG001, SLU10-SG002, SLU10-SG003, SLU10-SG004 |
| 0011 | 060320 | TB05-009 | 03 | SLU01-SG021, SLU02-SG022, SLU03-SG033 |
| 0012 | : | : | 04 | : |

STORAGE CONTROL APPARATUS AND STORAGE CONTROL METHOD

CROSS-REFERENCE TO RELATED APPLICATIONS

This application relates to and claims priority from Japanese Patent Application No. 2006-228226, filed on Aug. 24, 2006, the entire disclosure of which is incorporated herein by reference.

BACKGROUND

1. Field of the Invention

The present invention relates to storage control apparatus providing storage resources to upper order apparatus such as a host computer or server etc., and particularly relates to storage control apparatus where a number of storage devices are arrayed so that storage regions are configured using RAID. More specifically, the present invention relates to storage control apparatus supplying to a host a first logical volume that itself does not correlate to a real storage region correlating a second logical volume equipped with a real storage region from the storage resources with the first logical volume, and converting host accesses to the first volume to accesses to the real storage region via the second logical volume. Still more specifically, the present invention relates to storage control apparatus capable of increasing the real storage region correlating with the second logical volume according to accesses from upper order apparatus.

2. Background Art

Storage systems equipped with storage control apparatus, and upper order apparatus such as a server or host computer etc. connecting with this storage control apparatus via a communication path such as a network etc. are well known. Here, upper order apparatus store data on storage devices by logically defining logical volumes that are capable of being accessed by the upper order apparatus and correlating physical storage regions of the storage devices with the logical volumes. It is then possible for the storage control apparatus to read out data stored in the storage device. Hereinafter, the term host may be used to refer to any upper order apparatus. That is, the terms upper order apparatus and host may be used interchangeably.

In recent years, the volumes of data handled by upper order apparatus have dramatically increased, meaning that substantial increases in storage capacity (volume size) of logical volumes is also necessary. It is therefore ensured that upper order apparatus do not run out of storage capacity by ensuring that storage regions allocated to logical volumes are sufficiently large.

However, in the event that a large logical volume is allocated to upper order apparatus while in reality large volumes of data are not handled by the upper order apparatus, regions that are not used periodically cannot be released for use by other upper order apparatus, which is wasteful with regards to storage resources.

Here, allocating storage regions of a storage device to a region of a logical volume where writing is performed when a processor of an upper order computer writes to a logical volume of storage apparatus is proposed (Japanese Patent Laid-open Publication No. 2005-11316). As a result, storage regions can be made active in an effective manner compared to allocating a large volume of storage regions to the logical volume in advance. Further, it is also disclosed in U.S. Pat. No. 6,823,442 that storage control apparatus is provided at a logical volume accessed by upper order apparatus, with physical storage regions then being allocated to this virtual volume.

"Data life cycle management" also exists as a further way of making storage resources of a storage system active in an effective manner. This takes note of the fact that the value of data changes with the passage of time, with data where the frequency of access from upper order apparatus is low or the time that has elapsed from an access is long being moved from online storage to near line storage or back-up devices so that storage regions of comparatively high-value online storage capable of high-speed responses to accesses from upper order apparatus are then made active in an effective manner.

As an example of the related art pertaining to the present invention, there is disclosed in Japanese Patent Laid-open Publication No. 2005-128771 that relates to a data file system etc. provided with a data access server that has physical storage for storing data, receives access requests, and accesses this physical storage, and a data file server that sends access requests to this data access server, utilizes the data access server in data saving, and files data, with physical blocks then being effectively released when logical blocks are not in use.

Further, in Japanese Patent Laid-open Publication No. 2004-127301, a storage control system is disclosed that comprises a mapping system with a virtual storage space and physical storage space that correlates a plurality of addresses of the virtual storage space to each address of the physical storage space, and a controller configured so as to automatically delete parts of the mapping system in accordance with a provision assigning order of priority designating portions to be deleted of the mapping system in accordance with the priority order. Further, storage control apparatus is also disclosed in Japanese Patent Laid-open Publication No. 2006-106980 as an example of related art pertaining to the present invention.

SUMMARY

As shown in the related art examples described above, even if it is possible to make storage resources operate in a storage system in an effective manner, when the amount of data accumulated at the storage control apparatus increases, each type of data processing executed by the storage control apparatus on requests from the host becomes burdensome and data processing efficiency falls. For example, when data that is the target of the host is searched from data storage regions of the storage, an excessive amount of data is stored in the storage and the host cannot rapidly search for targeted data.

It is therefore the object of the present invention to provide storage control apparatus and a storage control method capable of rapidly carrying out data processing according to requests from the host, and capable of rapidly returning the results of processing to the host. A further object of the present invention is to provide storage control apparatus capable of rapidly carrying out searches according to search requests from host, and rapidly returning the results of this processing to the host. It is a still further object of the present invention to provide storage control apparatus provided with means for processing search requests from the host at the storage control apparatus and provide the results of the search for storage data to a plurality of hosts.

In order to achieve this object, the storage control apparatus of the present invention is characterized by configuring logical volumes correlated to a virtual volume, with storage regions of storage devices being allocated to the virtual volumes while there is an access to the virtual volume from the host, from a plurality of volumes taking note of the type of write data from the host. By doing this, the storage control apparatus is capable of carrying out data processing while recognizing the type of data based on requests from the host, and data processing can therefore be carried out both effectively and rapidly.

As described above, according to the present invention, it is possible to provide storage control apparatus and a storage control method capable of rapidly carrying out data processing according to requests from upper order apparatus, and capable of rapidly returning the results of processing to the upper order apparatus.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims. It is to be understood that both the foregoing and the following descriptions are exemplary and explanatory only and are not intended to limit the claimed invention or application thereof in any manner whatsoever.

BRIEF DESCRIPTION OF THE DRAWINGS

FIG. 11 is a management table showing control information for allocating logical volumes set for storage regions belonging to a pool to a virtual volume;

FIG. 12 is a table for managing characteristics of a pool volume;

FIG. 13 is a table for storing and managing meta-information (index information);

FIG. 14 is a table for managing index information for text data;

FIG. 15 is a table for managing index information for block data;

FIG. 16 is a table for managing index information for large sized data;

FIG. 21 is an information table storing history relating to results of searches carried out by storage control apparatus;

DETAILED DESCRIPTION

Figure 1:
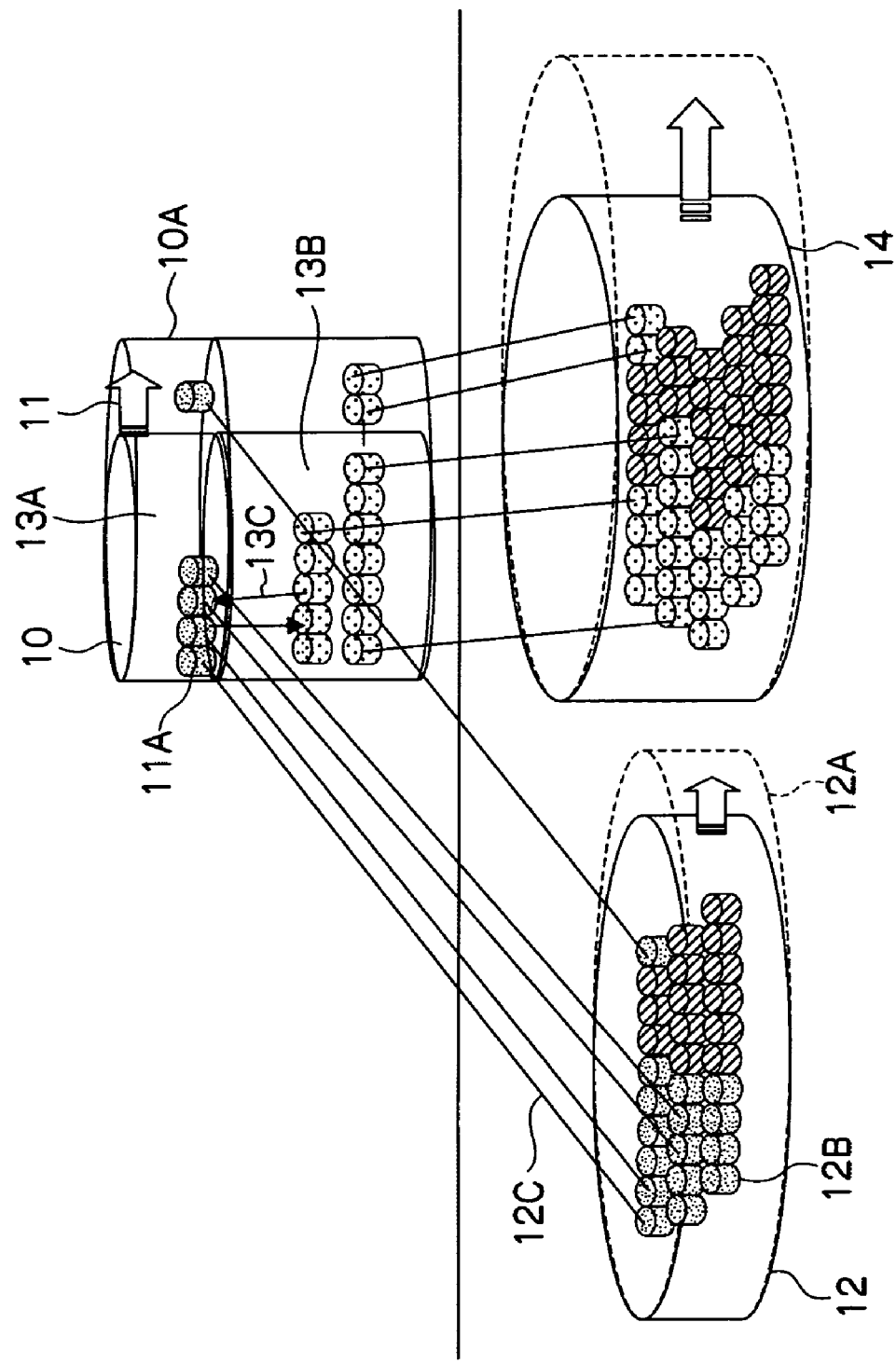
FIG. 1 is a basic function block view showing a storage control operation of storage control apparatus of the present invention.

FIG. 1 is a basic function block view showing a storage control operation of storage control apparatus. The storage control system of the present invention adopts AOU to make storage resources effectively active. Here, AOU is an abbreviation for "Allocation On Use". AOU is described based on FIG. 1. In AOU, storage control apparatus supplies to the host a virtual volume that has not been allocated a physical storage region. A physical storage region belonging to a pool (logical volume) is then being made to correspond to this virtual volume. When upper order apparatus accesses the virtual volume, storage control apparatus allocates a storage region contained in a pool to a virtual volume region accessed by the upper order apparatus. This allocation is executed as a result of the upper order apparatus accessing the virtual volume. The storage control apparatus prepares a virtual volume having a large dummy capacity in advance. The storage control apparatus then adds storage capacity to the pool according to the conditions of allocation to the virtual volume of the storage region belonging to the pool volume. The virtual volume corresponds to the first logical volume of the claims, and the pool corresponds to the second volumes of the claims.

In FIG. 1, numeral 10 is a virtual volume. As shown by numerals 11 and 10A, the virtual volume is capable of extending its capacity as necessary. Numeral 11A is a logical address region within the virtual volume, and this region itself does not have a pre-assigned physical storage region.

Numeral 12 and 14 are pools, and actual storage regions of storage devices such as hard disc drives etc. are allocated to these pools. A trace for a drum shape shown by numeral 12B shows one section of the storage region belonging to the pool, i.e. a unit of a storage region. This is referred to as a chunk. Chunks from the storage region of the pool are allocated to a region 11A, that is of a certain size logically of the virtual volume. The upper order apparatus performs write accesses in order to write data to a storage device and performs read accesses in order to read data from the storage device with respect to the virtual volume 10.

Numeral 12 is an online pool storing online data, and numeral 14 is an archive pool storing archive data. Online data refers to data where the frequency of accesses from the upper order apparatus is high, or the time that has elapsed from an access is short. Archive data refers to data where the frequency of accesses from the upper order apparatus is low, or the time that has elapsed from an access is long. Data is then moved between the online pool and the archive pool.

It is then possible to extend the region for the pool by allocating new storage regions to the pool as necessary. The storage control apparatus allocates new storage regions to the pool when the storage regions to be allocated to the virtual volume are insufficient at the pool. Storage regions allocated to the pool are then allocated to a virtual volume from the pool and chunks (corresponding to segments of a pool logical volume in the following description) taken as management regions are registered in an information table within storage control apparatus and managed. Chunk size is set by the administrator as necessary. Chunks may be, for example, a typical block size of 256 B to a number of MB to a number of GB taken as data for very large images.

Storage regions are supplied from storage devices within the storage control apparatus. In addition to a hard disc drive, a storage device may be semiconductor memory such as flash memory, etc. This is in no way limited. The virtual volume 10 is divided into two hierarchies of an upper and lower hierarchy, as shown in the drawings. A storage region of an online pool 12 is allocated to a region of upper hierarchy 13A. A storage region of an archive pool 14 is allocated to a region of lower hierarchy 13B. In the event that data is moved between the online pool and the archive pool, as shown by numeral 13C, a logical block address region is moved between a region of upper hierarchy 13A and a region of lower hierarchy 13B within the virtual volume. The capacity of the pool can then be increased by adding storage devices to the storage control system.

Figure 2:
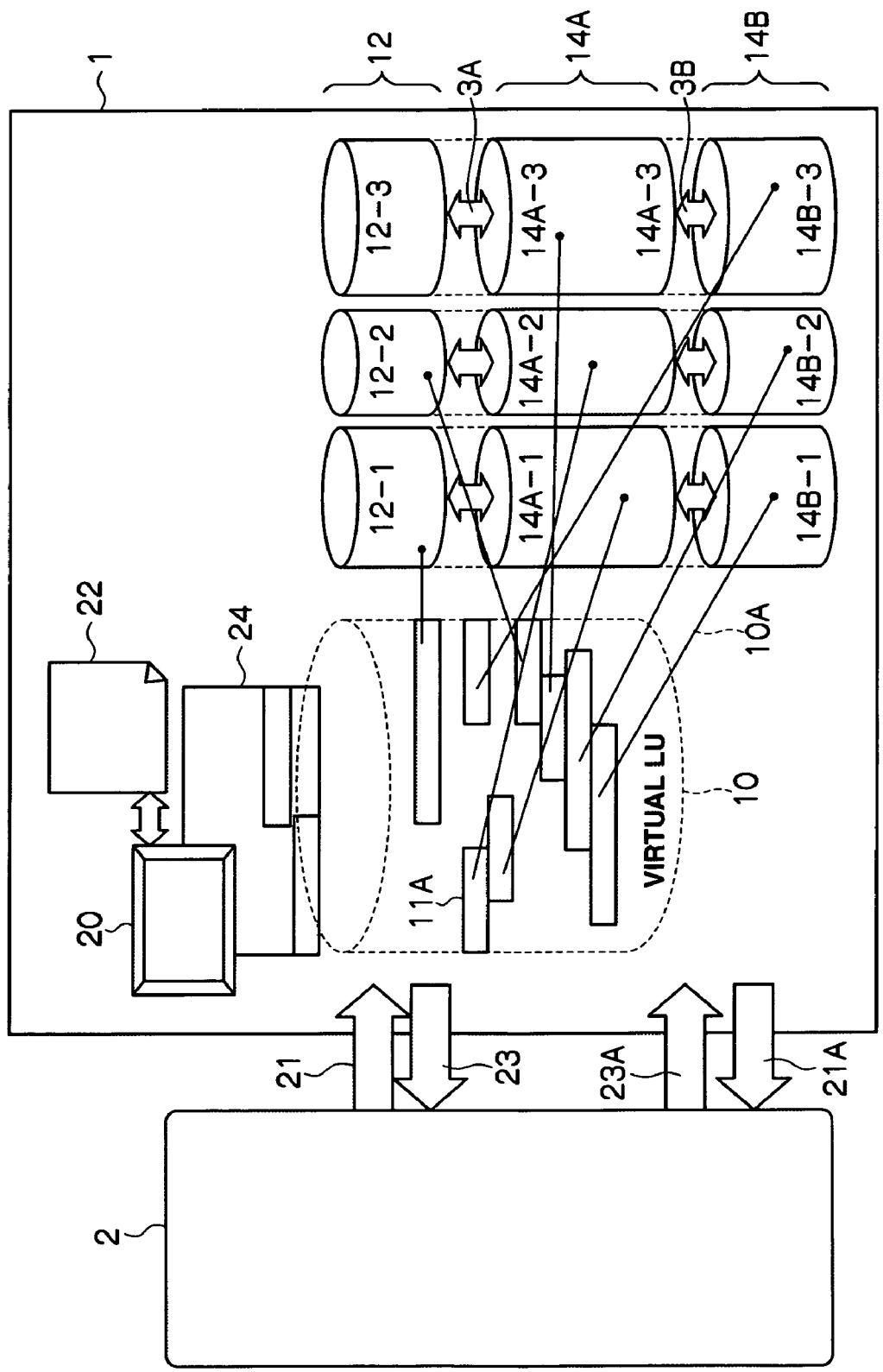
FIG. 2 is a function block view of a computer system equipped with storage control apparatus 1 and upper order apparatus 2.

FIG. 2 is a function block view of a computer system equipped with storage control apparatus 1 and upper order apparatus 2 e.g. a host. In addition to the pool volume being configured from an online pool and an archive pool, the pool that data is stored in is different depending on the type of data write-accessed from host 2 to storage control apparatus 1. Online pool 12 is comprised of a text data storage pool 12-1 for storing text data (for files), a block data storage pool 12-2 for storing block (for databases) data, and a large sized data storage pool 12-3 for storing large sized (for images) data. The same also applies for archive pools 14A and 14B.

Archive pool 14A is an active pool and archive pool 14B is an non-active pool. Discrimination of active and non-active is based on responsiveness with respect to write accesses and read accesses sent from host 2 to the storage device supplying storage regions to the pool to storage control apparatus 1. For example, a power supply of a storage device corresponding to a pool that is active is maintained on, and a power supply of a storage device corresponding to a pool that is non-active is turned off. In the event that an access from an upper order apparatus or a controller (control section) of a storage control apparatus to a pool that is non-active, after the storage device goes on, the upper order apparatus performs a write access or read access for this storage device. It is then possible to make the amount of power required by the storage control apparatus small by turning off the power supplies of storage devices supplying storage regions to archive pools (non-active) that do not supply storage regions to online pools or archive pools (active).

Virtual volume storage region 11A corresponds to each type of pool volume according to the type of data itself where the data is text data, block data, or large sized data. Further, virtual volume storage region 11A can be allocated to online pools or archive pools according to the type of data relating to the access frequency for data of the upper order apparatus, i.e. according to online data or archive data. It is preferable for storage devices supplying storage regions to the online pool to conform to an interface standard capable of responding at high speed to accesses from a host. An example may be an FC drive taking a fiber channel as an interface. For example, a low cost, large capacity SATA drive or ATA drive may be utilized as a storage device for supplying storage regions to archive pool volumes because the access frequency from an upper order apparatus to the archive pool is not higher than for the online pool. Storage control apparatus 1 moves data for the online pool to the archive pool (active) based on history of the host accessing the data. On the other hand, data of the archive pool (active) is moved to the archive pool (non-active). Conversely, data is also moved from the archive pool to the online pool.

Storage control apparatus 1 is equipped with a search engine 20 for searching for data patterns stored in the storage regions of each pool. The storage control apparatus itself then searches for data stored in the pool based on search accesses from the upper order apparatus using this search engine, in place of the upper order apparatus. In order for the storage control apparatus to carry out this search effectively, meta-information is inputted every write access from a host, and this is registered in an information table. The meta-information may be an index assigned in advance by the upper order apparatus to write data contained in a frame accompanying a write access. A typical example of this index is a keyword. Meta-information is put into the form of a table and stored in memory of the storage control apparatus 1. Further, storage control apparatus puts the history relating to search indexes and search results for searches carried out in the past into the form of a search log and also puts this in the form of a table for saving in memory. The storage control apparatus then carries out subsequent search processing in an effective manner by referring to the search log.

Upper order apparatus 2 is equipped with a program necessary for executing searches at storage control apparatus 1. For example, in the event that upper order apparatus makes a write access to the storage control apparatus 1, index information (keyword) is put in a frame containing write data (21). The storage control apparatus 1 then supplies meta-information for meta-information (index information) table (22) to the upper order apparatus 2 (23). The upper order apparatus is then able to refer to the meta-information, and instruct searches utilizing past search history within the storage control apparatus to the storage control apparatus. Moreover, the upper order apparatus issues a search command containing a search range and search pattern to the storage control apparatus (23A), and the storage control apparatus responds to the upper order apparatus with search results based on this search command. The upper order apparatus then displays the search results at itself or at the screen of each client of the upper order apparatus. Numeral 24 is cache memory for the storage control apparatus, and the control section of the storage control apparatus carries out searches at high-speed by utilizing the cache memory. Search engine 20 of the storage control apparatus receives search commands from the upper order apparatus, carries out optimization processing to implement searches utilizing the past search log, and executes searches based on optimization processing results.

Storage control apparatus executes the searches described here for specific pool volumes. In the related art, text data, block data, and large sized data was stored together in a pool volume. When it is taken that the search engine of the upper order apparatus carries out searches for specific data, it is therefore necessary to search for all types of data including data of a large capacity. This means that searches were time-consuming and that effective searches were not possible.

With the storage system shown in FIG. 2, it is possible to carry out searches effectively because the storage control apparatus 1 receives commands relating to search keywords and data type from upper order apparatus and is capable of specifying the pool volume constituting the search target. Further, the storage control apparatus itself is provided with a search engine and the upper order apparatus can therefore be released from processing for the searching. Moreover, the storage control apparatus can refer to meta-information and a search log and processing for searching can therefore be made more effective. An NAS (Network Attached Storage) blade and NAS gateway is also included as the upper order apparatus. See, e.g. NAS blade for Tagma Store® available from Hitachi Data Systems.

The search pattern is decided by selecting of an index for searching and specifying the form such as the type etc. of data to be searched at the upper order apparatus. Search range is then decided by the upper order apparatus specifying whether searching is to be carried out for which virtual volume of the number of virtual volumes. It is also possible for a number of virtual volumes to be seen at the upper order apparatus, so that a specific virtual volume can be designated. FIG. 2 shows one virtual volume only for the sake of convenience.

In the event that the storage control apparatus searches for data, it is also possible to search in the order of online pool, archive pool (active), and archive pool (non-active), and to make the archive pool (non-active) active while searching the online pool and archive pool. For example, when a search is started based on a search request from a host and it is determined that the data to be searched is text data, first, the storage control apparatus searches the online pool and the archive pool (active) in that order, and a text data archive pool is put to active during the searching. Alternatively, in the event that the storage control apparatus discerns the pool holding the search target data, storage regions belonging to this pool are searched first.

Figure 3:
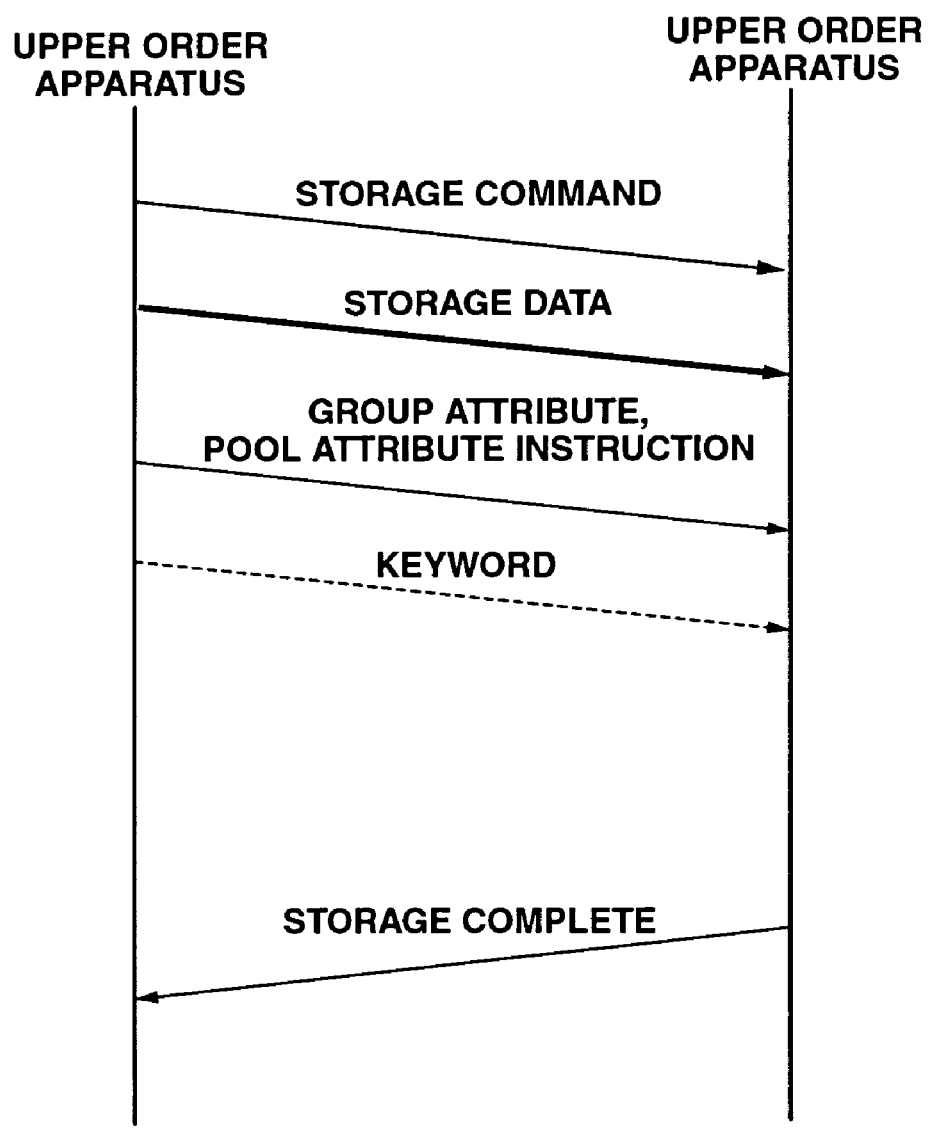
FIG. 3 is a timing chart for while upper order apparatus perform a write access to storage control apparatus.

FIG. 3 is a timing chart for while upper order apparatus perform a write access to storage control apparatus. First, the upper order apparatus issues a write command (storage command) to the storage control apparatus. Next, the upper order apparatus sends data to be stored to the storage control apparatus. The upper order apparatus then designates the data type (group attribute) and attributes (discrimination of online pool/archive pool, discrimination of active/non-active) of the pool that is to store the data to the storage control apparatus. As described above, the type of data is whether the data is text data or some other kind of data. Next, the upper order apparatus sends index information (keyword) to the storage subsystem. The storage control apparatus stores data in an appropriate pool based on information sent from the upper order apparatus. Further, meta-information containing the index information is stored in a management table.

Figure 4:
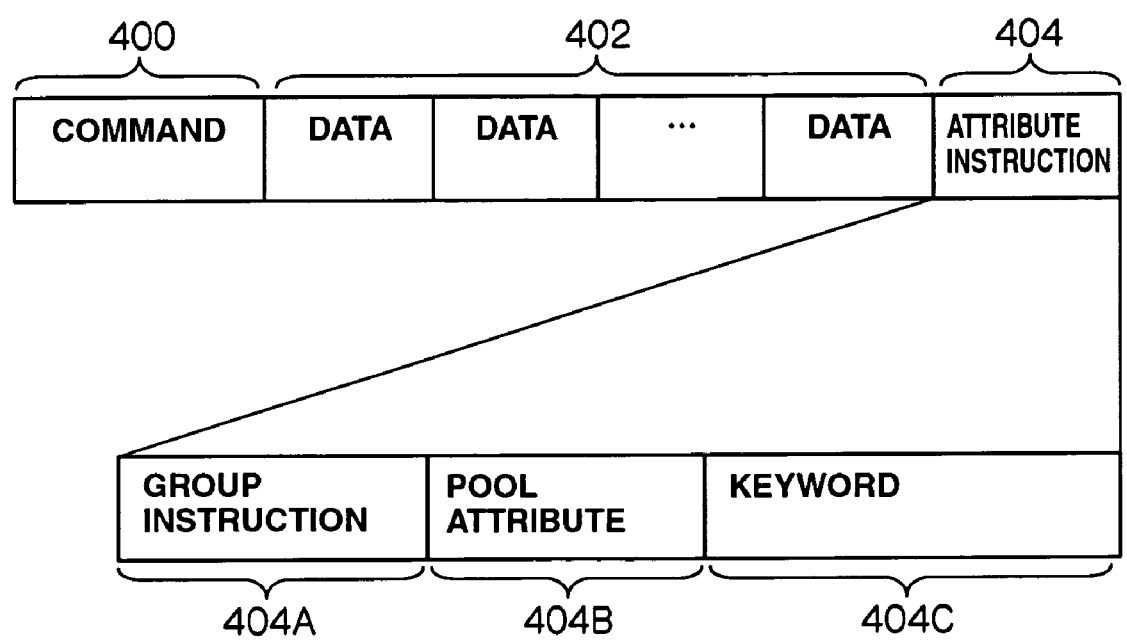
FIG. 4 is a example configuration for a frame accompanying a write access issued from upper order apparatus to storage control apparatus.

FIG. 4 is a example configuration for a frame accompanying a write access issued from upper order apparatus to storage control apparatus. A frame is comprised of region 400 indicating a write command, region 402 indicating write data, and region 404 indicating attributes of data. The region for data attributes 404 is composed of region 404A for group attributes, region 404B for pool attributes, and region 404 for keywords. A logical block address of a virtual volume accessed by the upper order apparatus is contained in the write command. The storage control apparatus then replaces the access to this logical block with an access to a storage region (physical volume or real storage region) contained in a pool corresponding to this address utilizing a conversion table it is itself provided with.

The group attribute distinguishes whether the data is text data, block data, or large sized data. Bit data indicating the group attribute of "01" is text data (file data), "02" is block data, and "03" is large sized data, respectively. The storage control apparatus is then able to know the type of data sent from the upper order apparatus by recognizing this bit data. The above description pertaining to the type of data is given as one example. The upper order apparatus may also determine the group region for the data at the storage control apparatus side. In this case, "FF" is stored at the region for 404A. The storage control apparatus then recognizes this flag and determines the type of data itself. For example, the storage control apparatus is capable of deciding whether an extension exists, and depending on what the extension is, whether data is file data or block data, or is constituted by bits.

The pool attribute is information relating to whether the pool intended for storing the data is an online pool or archive pool. Here, "01" indicates an online pool, and "02" indicates an archive pool. "FF" shows that the decision regarding the pool attribute is entrusted to the storage control apparatus side. An optimum keyword specifying the data 402 is stored in 404C. The storage control apparatus stores this keyword (meta-information) in the information table. In the event that there is no change in the group attribute, pool attribute, or keyword, "NULL" is set for the bit arrangement.

Figure 5:
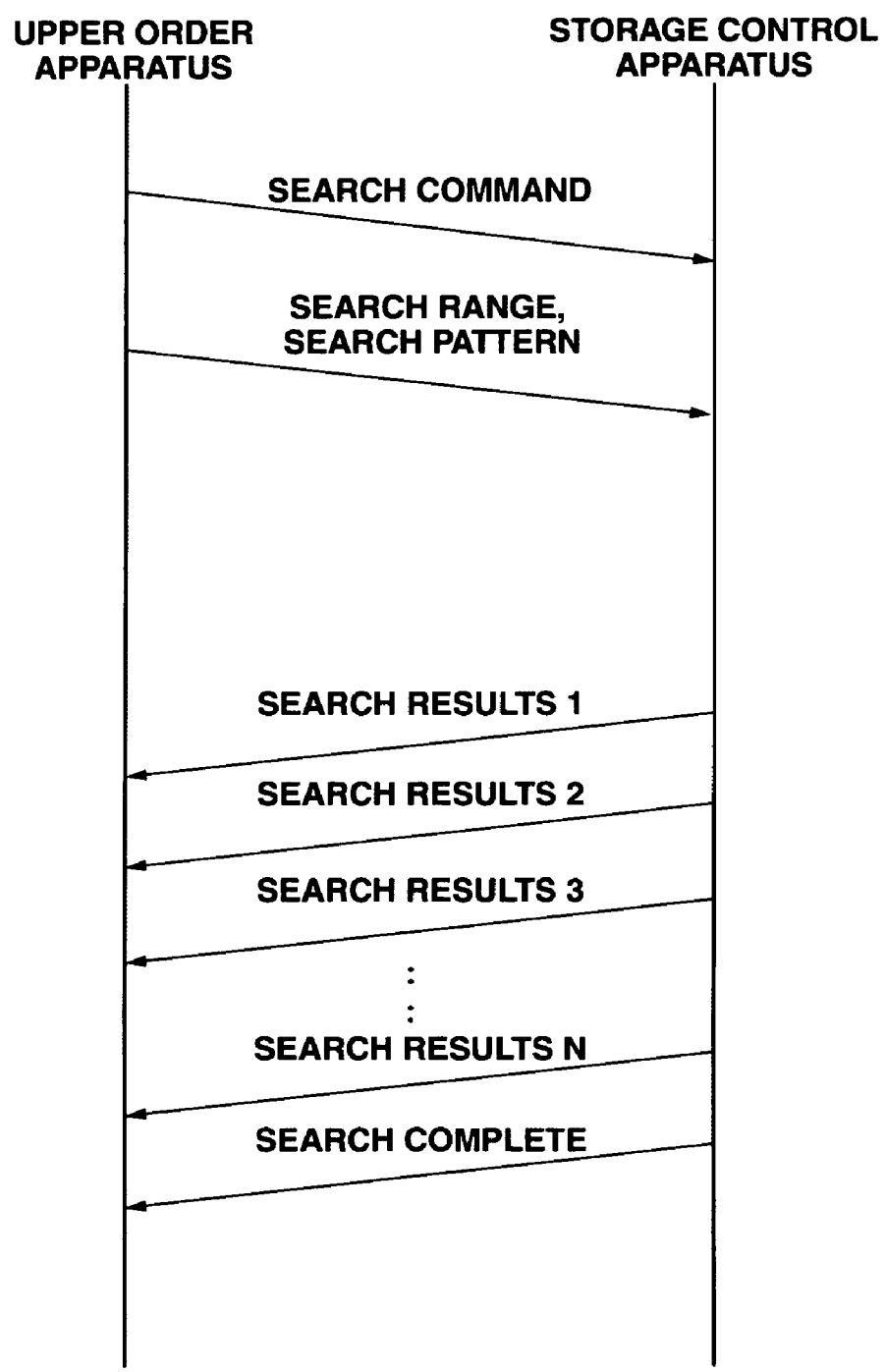
FIG. 5 is a timing chart for the case where a search engine (search command) of storage control apparatus executes an actual search for data based on an instruction (search command) from upper order apparatus.

FIG. 5 is a timing chart for the case where a search engine (20 of FIG. 2) of storage control apparatus executes an actual search for data based on an instruction (search command) from upper order apparatus. The upper order apparatus then issues a search command to the storage control apparatus. The upper order apparatus instructs search pattern and search range to the storage control apparatus. The storage control apparatus carries out searching in accordance with the program for searching, search results (1, 2, 3, ... n) are sent to the upper order apparatus, and the search is complete.

Figure 6:
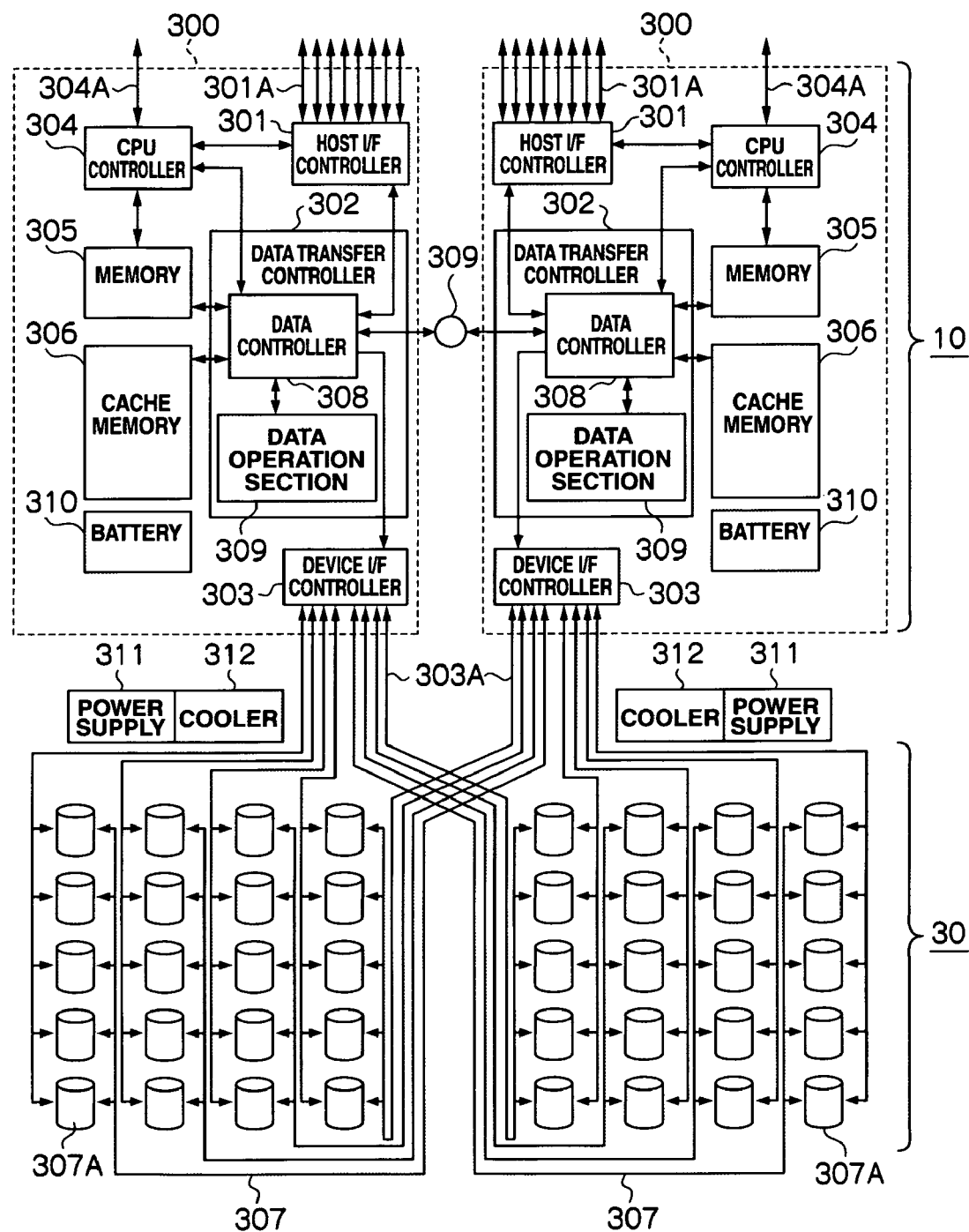
FIG. 6 is a block view showing an example configuration for hardware for storage control apparatus (storage sub-system)

FIG. 6 is a block view showing an example configuration for hardware for storage control apparatus (storage sub-system). The storage sub-system is comprised of a storage controller 300 (control circuit) and storage driver apparatus 30.

The storage driver apparatus 30 is equipped with a large number of physical disc drives for storing data in an array. As a result, it is possible to provide a large capacity of storage regions to the upper order apparatus. The physical disc drives are comprised of a data recording media such as hard disc drives. A large number of storage devices are configured as a RAID, and redundancy of storage data is achieved.

A cluster configuration where pairs of controllers of the same respective configurations are connected by connecting sections 308 is shown in FIG. 6. Namely, the storage control apparatus brings about redundancy with the controllers. Both controllers are capable of accessing the same physical discs. The configuration of both controllers is the same so that if the configuration for one controller is given, the description for the other controller will be omitted.

The controller controls physical discs in accordance with commands received from the upper order apparatus. For example, a data write request is received from the upper order apparatus, and data is written to a storage volume the storage driver apparatus is provided with. At physical volumes that are physical storage regions provided by physical disc drives, the controller is capable of setting one or a plurality of logical volumes that are logical storage regions. As described previously, the controller of the present invention supplies virtual volumes (these are also logical volumes) that do not correspond with physical volumes to the upper order apparatus, and pools corresponding to physical volumes are defined at the lower hierarchy of the virtual volumes. The upper order apparatus makes a pool correspond to virtual volumes. Namely, the upper order apparatus allocates physical volumes of the pool to virtual volumes. Upper order apparatus are information processing apparatus such as computers equipped with a CPU and memory. Each of the various programs are then executed by a CPU the information processing apparatus is provided with.

The upper order apparatus then makes data input/output requests, and carries out data transmission and receiving with the controller 10 via SAN in accordance with fiber channel protocol. In addition to SAN, it is also possible to connect the upper order apparatus to the controller via an IP-SAN (Internet Protocol Storage Area Network). IP-SAN carries out the exchange of data input/output requests and exchange of data transmission and receiving signals between the upper order apparatus and the controller according to internet protocol. Numeral 301A is a line connecting host interface controller 301 and a SAN. Thereafter the upper order apparatus may also be referred to as a "host". The host may also be connected to a host input controller. Further, storage control apparatus 10 and storage driver apparatus 30 may be in the same casing or may be in separate casings.

In addition to host interface controller 301, the controller is equipped with CPU controller 304, meta-data memory 305, cache memory 306, data transfer controller, and device interface controller 303. Host interface controller 301, data transfer controller 302, and device interface controller 303 are respectively configured from an LSI. Here, each element of the configuration described is mutually connected as shown by arrows in FIG. 6. Numeral 304A is a communication section connecting CPU controller 304 and management apparatus. The management apparatus is connected to management apparatus via CPU controller 304 via communication section 304A. Although not shown in the drawings, the management apparatus makes various settings necessary for the control unit to carry out data conversion with the host for the controller via the CPU controller. The information after this setting is then stored in meta-data memory 305 as a control table.

The host interface controller 301 communicates with the host using a fiber channel protocol or an internet protocol, receives data input/output requests from the host, and carries out data transmission and receipt with the host.

Figure 7:
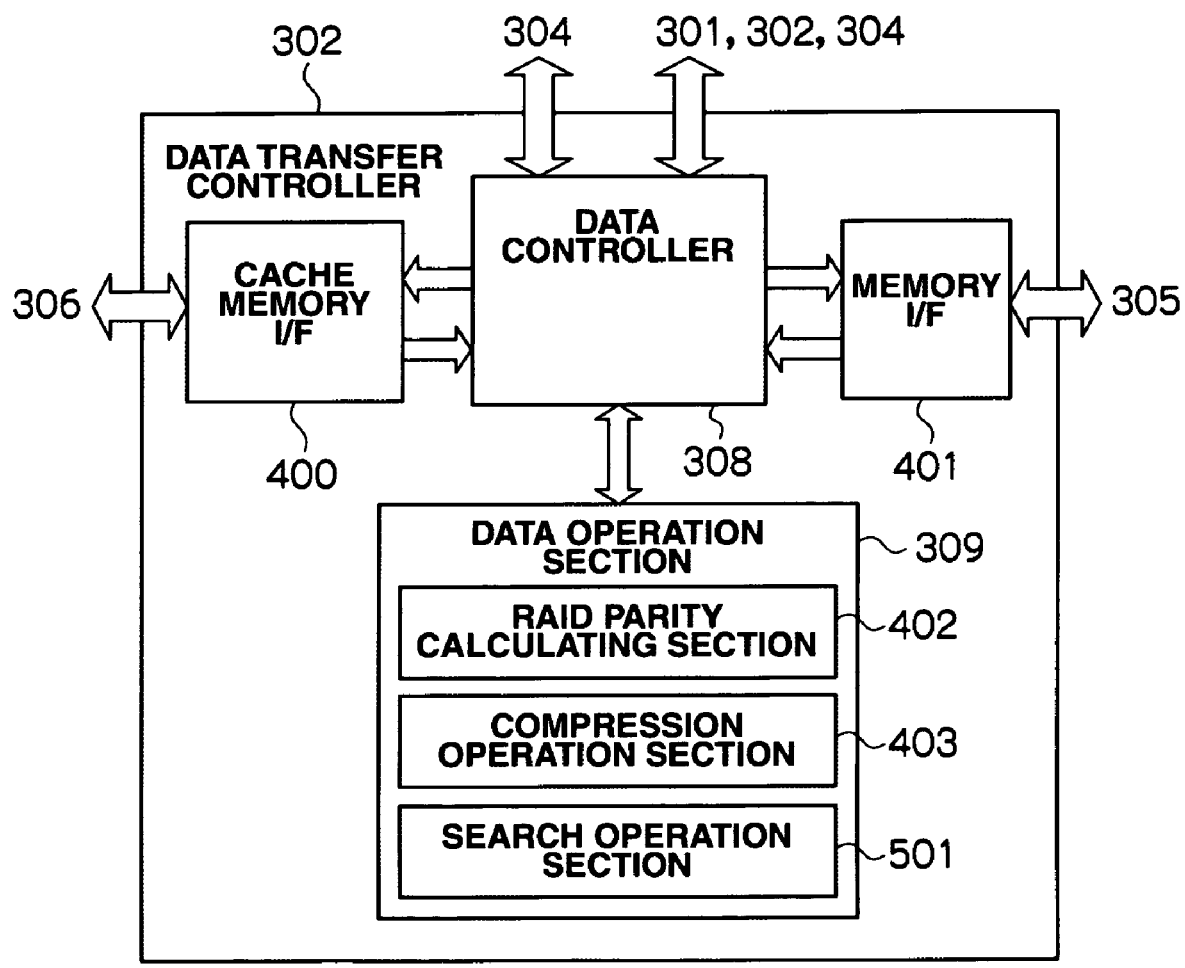
FIG. 7 is a detailed block view of data transfer controller 302.

As shown in FIG. 7, a data transfer controller 302 controls transfer of data between the host and a storage device group 307 based on write accesses and read accesses from the host. The data transfer controller 302 is equipped with a data controller 308 bearing the bulk of the control processing. The data controller 308 is connected to a host I/F section 301, meta-data memory 305 for storing meta-data, and cache memory 306. Numeral 400 is an interface with the cache memory, and numeral 401 is an interface with the meta-information memory.

Data transfer controller 302 is equipped with data operation section 309. Data operation section 309 is equipped with RAID parity calculating section 402 calculating RAID parity of data sent from data controller 308, compression operation section 403 for carrying out expansion of compressed data or data compression processing, and search operation section 501 for data searching.

The controller is further comprised of cache memory 306 for temporarily storing data written from the host to the storage device and data read by the host from the storage device, meta-data memory 305 for storing meta-data comprised of the aforementioned index (keyword), and a device interface 303A for connecting the data control section with HDD (Hard Disk Drive). The data interface controller 303 is connected so as to be capable of communicating with the storage volume storing data, and controls the physical disc.

The data transfer controller 302 carries out bridging of control information (for example, data input/output requests) between host interface controller 301 and CPU controller 304 or device interface controller 303 and CPU controller 304, or performs control of data transfer control between host interface controller and cache memory 306, and between device interface controller and the cache memory.

CPU controller 304 controls the host interface controller, disc interface controller, and data transfer controller with respect to control information from the upper order apparatus. Cache memory 306 temporarily stores data exchanged between the host interface controller and the disc interface controller.

For example, in the event that the host interface controller 301 receives a data input request from upper order apparatus, the same request is transferred to the CPU controller 304 via data transfer controller 302. The CPU controller detecting the transferred data request sets up the data transfer controller in accordance with the same request, the start of data transfer to the host interface controller is instructed, and data is stored in cache memory 306 via data transfer control from the host interface controller. The host interface controller storing the data in cache memory transmits completion of the same storage in the CPU controller. The CPU controller detecting completion of data storage sets up the data transfer controller, instructs the transfer of data to the storage value to the disc interface controller 303, and stores data from the cache memory 306 in the storage volume via the data transfer controller 302 and the disc interface controller 303.

Further, in the event that host interface controller 301 receives a data output request from the upper order apparatus, the CPU controller checks whether or not the data constituting the read target exists in the cache memory 306. Here, in the event that data read out from the cache memory does not exist, the CPU controller sets up the data transfer controller, instructs the start of data transfer to the disc interface controller, and stores data constituting the target of reading from a storage volume to a cache memory. On the other hand, in the event that read out data exists in cache memory (cache hit), or in the event that the data is stored in the cache memory as a result of a transfer, the CPU controller sets up the data transfer controller, instructs the start of data transfer to the host interface controller, and sends this read-out data to the information processing apparatus.

CPU controller 304 of FIG. 6 is equipped with a number of CPU cores, and the processing to be carried out by the CPU controller may also be distributed. For example, in the event that two cores, A and B, are provided as CPU cores, CPU core A may carry out transfer of data between the host interface controller and the cache memory, RAID parity operations, data compression-expansion functions, power supply control functions, battery control functions, volume duplication, volume management and remote copying, and CPU core B may carry out data transfer between the cache memory and the device interface controller, and searching of data.

A detailed block view of data transfer controller 302 is shown in FIG. 7. Numeral 308 shows the data controller executing mainly the data transfer operations. Data controller 308 is respectively connected to CPU controller 304, host interface controller 301 and disc interface controller 304. Numeral 308 is a connecting circuit connecting the data controllers of the two controllers. It is then possible to achieve redundancy for the system as a whole by connecting the two controllers.

The data controller 308 is respectively connected to a cache memory interface 400 and an information memory interface 401. The cache memory interface is an intermediary in the exchange of data between the data controller 308 connected to the cache memory 306 and the cache memory. The information memory interface is connected to the information memory 305, and is intermediary in the exchange of data between the data controller and the memory.

The data transfer controller 302 is equipped with data operation section 309, as shown in FIG. 7. The data operation section 309 is comprised of the RAID parity calculating section 402 for calculating RAID parity in the case that the storage volume is constituted by a RAID, the compression operation section 403 for carrying out compression and expansion of data, and the search operation section 501 for receiving search instructions from upper order apparatus for searches for data stored in the storage volume. An LSI constituting the data transfer controller may also be provided with a DMA controller for carrying out data transfer, a microprocessor constituting an operation unit, and memory storing a microprogram for implementing the operation processing. The RAID parity calculating section 402, compression operation section 403, and search operation section 302 may be separate or may be provided at the host interface controller 301 or the disc interface controller 303, and the CPU controller may also share the substitution function.

Communication lines 307A from respective device interfaces 303 of the two controllers are then connected to the hard disc drive 307 shown in FIG. 6. It is therefore possible for the same storage disc to be accessed from either controller. Numeral 310 is a battery provided as an emergency power supply within the controller. A disc array 30 is comprised of a power supply 311 supplying power to the drive circuit of a hard disc drive, and a cooler 312 for cooling the plurality of HDD.

Figure 8:
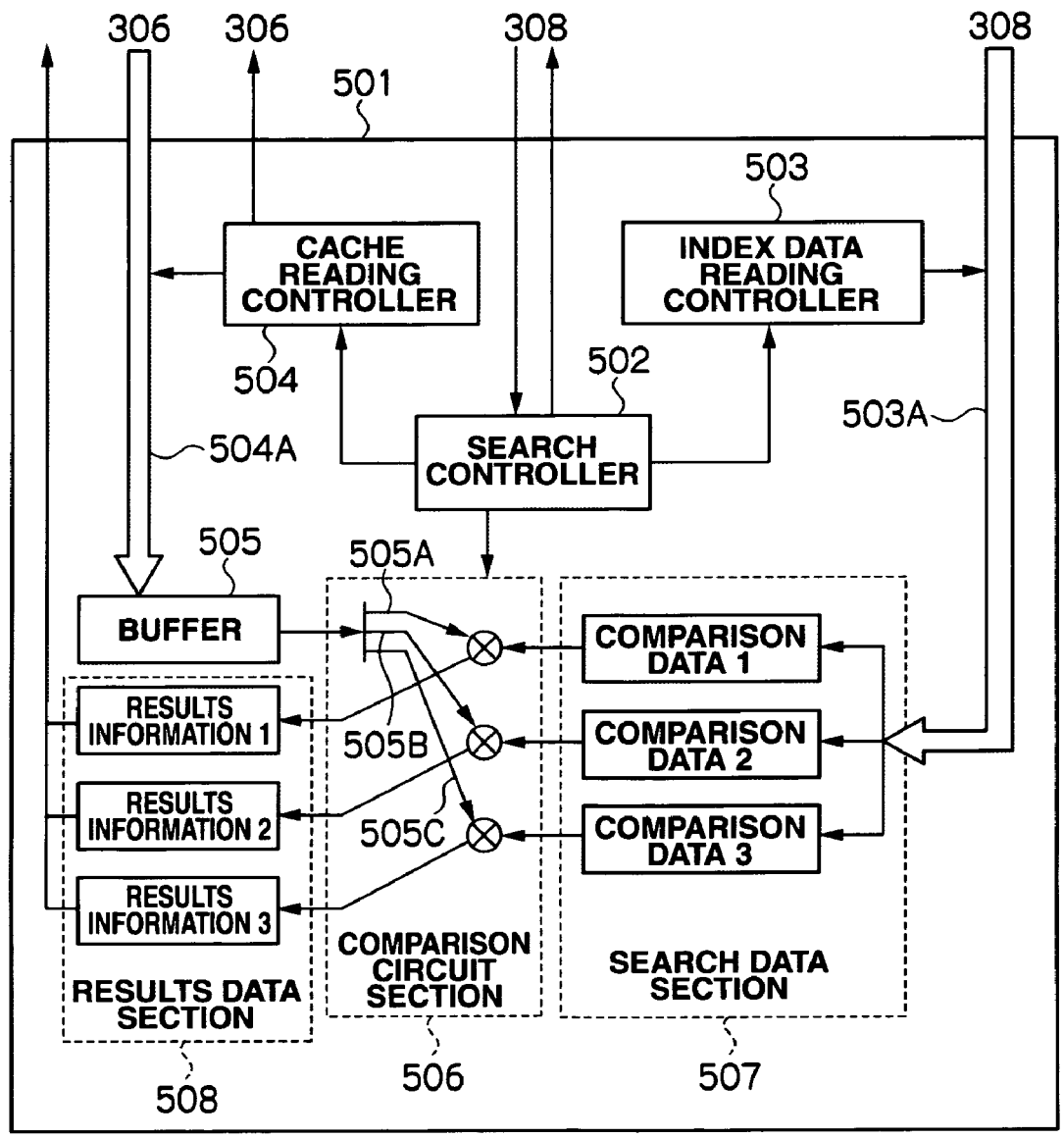
FIG. 8 is a function block view showing a search processing operation of a search operation section of a data operation section.

FIG. 8 is a functional block view showing a search processing operation of the search operation section 501 (search engine) of the data operation section shown in FIG. 7. An index data reading controller 503 controls reading of index data 503A sent from the host to a storage sub-system in order to search for data at search operation section 501. A cache reading controller 504 controls reading of data for searching from the HDD at cache memory 306.

Search buffer 505 sequentially reads out and temporarily stores the data 504A from the cache memory 306. The search controller 502 controls the index data reading controller 503 and the cache reading controller 504. The data controller 308 controls the search controller 502. Index data 503A sent to the data controller 308 is stored in a search data section 507 as comparison data 1, 2, 3. A comparison circuit section 506 compares each comparison data with comparison target data 505A, 505B and 505C stored in the search buffer, and stores search results for matching/non-matching in results data section 508 as results information 1, 2, 3. Results information is then returned to data controller 308. The data controller sends the comparison results to the host via the host interface controller 301.

Figure 9:
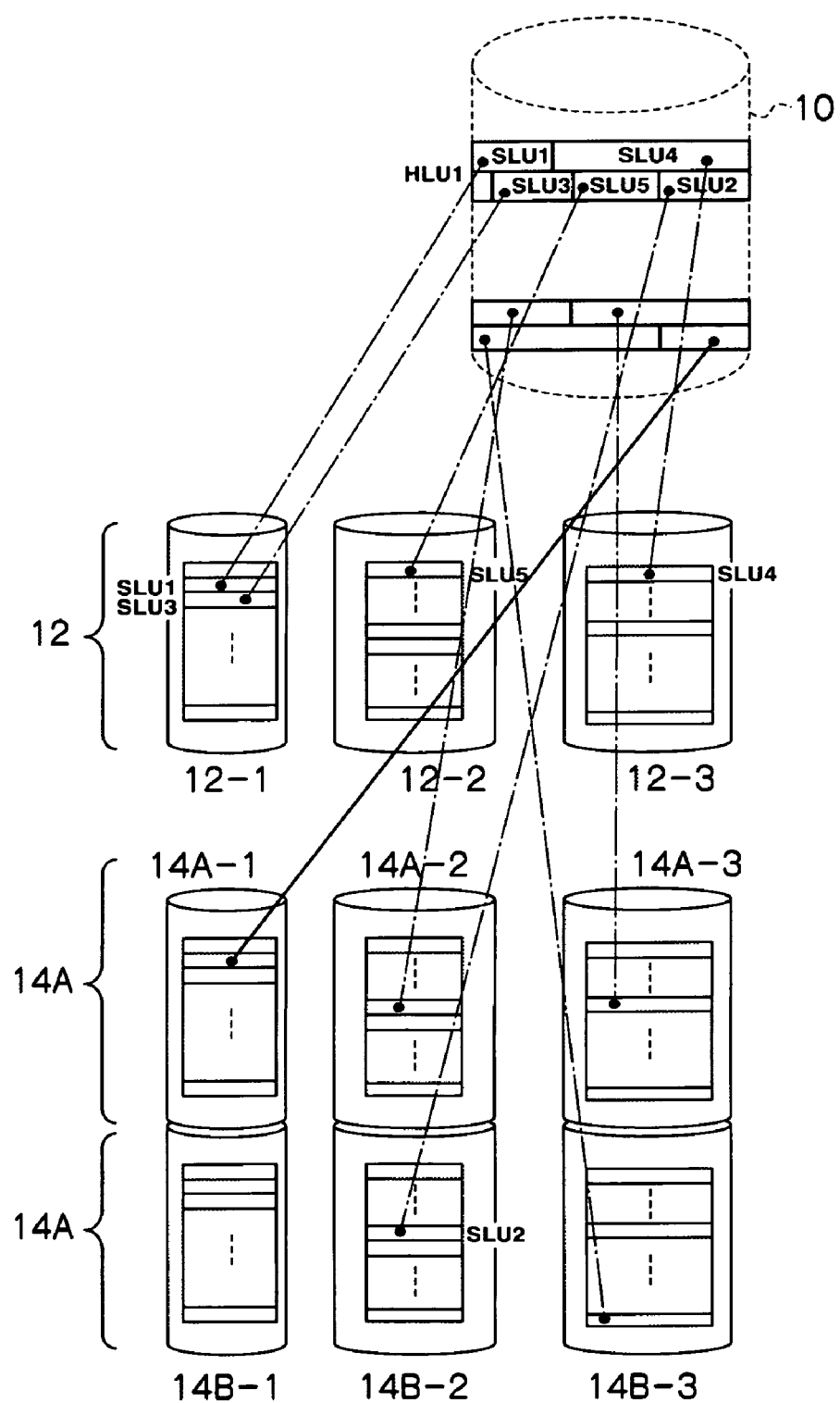
FIG. 9 is a block view showing a state where a sub-logical volume (SLU) of a pool volume is allocated to a sub-logical volume (SLU) of a virtual volume.
Figure 10:
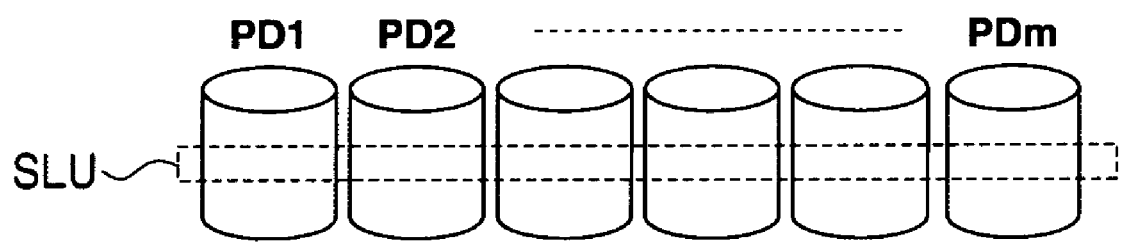
FIG. 10 is a block view showing a state where a sub-logical volume is formed over a number of storage devices PD1, PD2 . . . PDM.

FIG. 9 shows a state where a sub-logical volume (SLU) of a pool volume is allocated to a sub-logical volume (SLU) taken as a chunk unit constituting a virtual volume. The sub-logical volume of the pool volume (12, 14A, 14B) is formed along a plurality of storage devices PD1, PD2, . . . PDm as shown in FIG. 10. The upper order apparatus is capable of recognizing the sub-logical volume of the virtual volume 10. The physical storage region of the storage device allocated to the pool is logically defined as a sub-logical volume, and this sub-logical volume is allocated to a sub-logical volume of the virtual volume. The management apparatus decides a correspondence relationship of a certain region of the virtual volume and a sub-logical volume of the pool volume utilizing a GUI, and records this correspondence relationship in memory 305 in the form of a control table. The CPU controller 304 of the storage control apparatus changes access from the upper order apparatus to the virtual volume to accesses to the storage region of the pool volume based on this control table.

FIG. 11 is a management table showing control information for allocating logical volumes set for storage regions belonging to a pool to a virtual volume. This control table is stored in the memory 305. The CPU controller 304 refers to this control table and changes access from the host to the virtual volume to accesses to the storage device allocated to the pool. A host logic LU number of "HLU-1" is an LU for the virtual volume and, for example, shows that the logical block address of 0x014f0000 of this LU corresponds to a logic unit number SLU-27 of 0x014F0000 for the pool side logical volume. The logic unit number of the pool-side logical volume is shown as apparatus (storage device) logic LU number in FIG. 11.

In FIG. 1-1, Status is a specific value relating to attributes of the pool-side (storage device side) logical volume. Status1 indicates that the logical volume is a normal volume (01), sub-volume (02), reserve volume for system use (03), or unused (FF). Status2 indicates a volume capable of being read from and written to (01), readable/unwritable (02), reading and writing both not possible (03), and unused (FF). Status3 indicates a device within this storage (01), a device outside of this storage (02), and FF (undefined).

FIG. 12 is a control table showing further attributes of the pool-side logical volume. The CPU controller 304 refers to this control table and determines the characteristics of the pool that the logical volume defined for the storage device belongs to. The characteristics are the pool attribute, i.e. discrimination of whether the pool is an online pool or an archive pool, group attributes for data stored in the pool, i.e. discrimination of text data (data defined using a file format) (01), block data for database use etc. (02), and large sized data for images etc. (03), the Status of the pool, i.e. discrimination that the pool volume is an active type (01), the pool volume is non-active (02), the pool volume is active but the data stored in the pool volume is in a compressed state (03), or that the pool volume is non-active, and the data stored in the pool volume is compressed (04).

In the pool attributes, FF shows that the attributes are as yet unspecified. Every time a frame (FIG. 4) sent from the host is received, the CPU controller 304 stores data in the logical volume specified by the apparatus logic LU number, and describes attributes such as pool attributes etc. in the control table of FIG. 12. The control table shown in FIG. 12 is updated by the CPU controller 304 and stored in the memory 305. The CPU controller allocates storage regions of storage devices to the logical volume of FIG. 12 based on the allocation program of the storage region stored in memory. The type of storage the storage region can be allocated to is decided according to the pool attribute. As described above, this is an FC drive, or ATA drive, etc.

FIG. 13 is a table for storing and managing meta-information. As described in FIG. 4, meta-information is an index such as a keyword etc. decided at the upper order apparatus side for data stored in the sub-storage system from the upper order apparatus. This meta-information is set for every logical unit of the storage region defined as segments (shown as SG-001 etc.) in chunk units within the logical volume SLU of the pool. A plurality of segments are present at the logical volume the pool belongs to, and by setting index information at each segment, it is possible for the storage control apparatus to receive requests from upper order apparatus and provide high-precision searches to the upper order apparatus.

The upper order apparatus designates the index for this data to the storage control apparatus during searching for storage data. The index for the data is as described in FIG. 4. The storage control apparatus carries out data searching in an effective manner by searching segment regions this index is stored in. The relationship of the segment region (data boundary) and index is put in order by the CPU controller 304 at the table shown in FIG. 13 and is recorded in the memory 305. A list (FIG. 14 to FIG. 16 described later) for the index is supplied to the upper order apparatus by the CPU controller via the data transfer controller 302 and the host interface controller 301. The upper order apparatus then refers to the index list, selects an index, and sends a data search command to the storage control apparatus. As shown in FIG. 13, the storage control apparatus adds an index to the segments storing the data every time the transfer of frames from the upper order apparatus is received.

As described above, pool volumes storing data of different type (text data, database data, image data, etc.) in the virtual volume is correlated. It is possible to recognize differences in data on the storage control apparatus side while summarizing different types of data at the same volume at the host. As a result of the host simply specifying the virtual volume and search pattern as the search range, and as a result of the storage control apparatus recognizing the storage hierarchical layers (pool volumes, segments) to be searched, in the event that a command from the host to the storage control apparatus is a search command, it is possible to make processing for storing more efficient.

The index is divided into the form of tables for every data type. The storage control apparatus is therefore capable of knowing the logical volume (pool) to be searched by receiving the index relating to the search data from the upper order apparatus. The storage control apparatus is therefore capable of carrying out rapid data searching. It is also possible for the upper order apparatus to instruct the storage control apparatus of the type of data to be searched. It is also possible to set a logical volume for every type of data at the next hierarchical layer of the virtual volume.

In FIG. 13, Index1 to Index4 are items specifying the respective index information. For example, the start address of the logical block address of one segment (SG-0001) is 0x0000, and the region size is 008 (for example, 256B×008=4 KB). An Index1 specified by index table number "TB01" and index number "001", Index2 specified by "TB02-003", and Index3 specified by "TB01-005" referred to as "TB01-001" are set for data stored in this segment.

The index table is a table classifying a plurality of indexes for every data type. The index table specified by "TB01-001" is shown in FIG. 14. In FIG. 14, the index table number is divided into a plurality of index numbers, with an index data pattern (text keyword) being stored at each index number. FIG. 14 is an index table for text data.

In FIG. 13, "TB02" is the index table shown in FIG. 15. The table of FIG. 15 shows the index corresponding to the block data. As in FIG. 14, in FIG. 15 also, classification takes place into a plurality of index numbers, with meta-information of a database keyword, search word, or search type being stored for each index number. "TB03" of FIG. 13 is the index table shown in FIG. 16. The table of FIG. 16 shows the index corresponding to the large sized data. In FIG. 16 also, as in FIG. 14 and FIG. 15, classification takes place into a plurality of index numbers, with bitmap patterns being recorded as index data patterns at each index number. Data size is also recorded at each bitmap pattern in FIG. 16.

Each time there is a write command (FIG. 4) from the upper order apparatus, the CPU controller 304 recognizes the type (404A) of data in the data frame accompanying this write instruction, and writes the index information 404C in the corresponding table of FIG. 14 to FIG. 16. This table is then recorded in shared memory 305. The CPU controller then links FIG. 13 and FIG. 14 so as to be capable of knowing the content of the index information for the segments (SG of FIG. 13).

Figure 17:
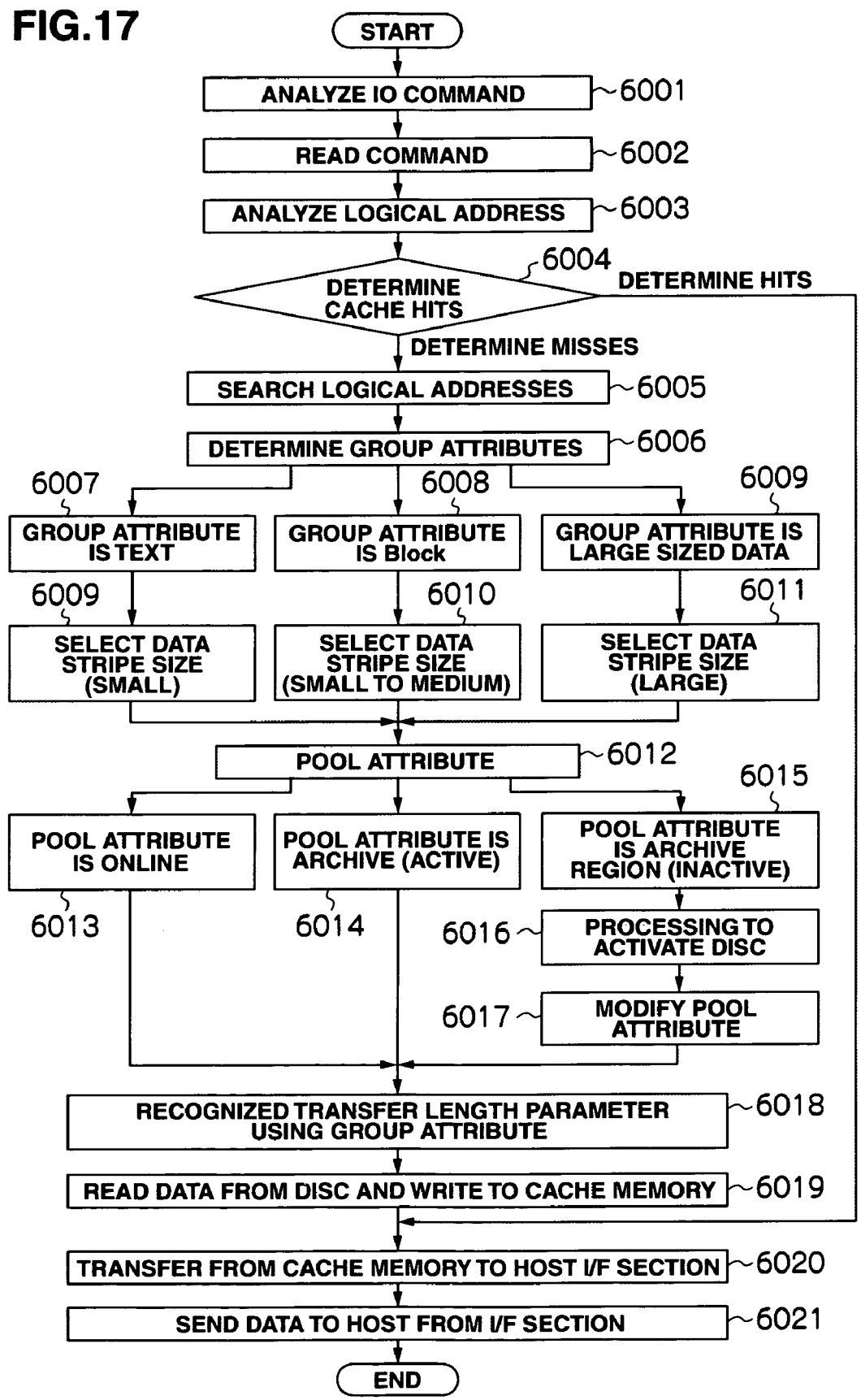
FIG. 17 is a flowchart showing the operation of storage control apparatus while storage control apparatus receives a read command from upper order apparatus.

FIG. 17 is a flowchart showing the operation of storage control apparatus while storage control apparatus receives a read command from upper order apparatus. The CPU controller 304 analyzes an 10 command issued by the host (6001), and when a read command is recognized (6002), the logical address of the virtual volume accessed by the host is analyzed (6003). The CPU controller then performs a cache hit determination as to whether data for the logical address is in cache memory (6004). In the event of a hit determination, the CPU controller transfers data of the cache memory 306 at the data transfer controller 302 to the host interface controller (6020). Next, the host interface controller 301 sends the data to the host (6021).

In the event that a cache miss is determined in step 6004, the CPU controller 304 refers to the control table shown in FIG. 11, and specifies a corresponding pool region and logical volume (SLU) from the previous virtual volume the host issued a read command for (6005). A real storage region of the storage device is then allocated to the logical volume.

Next, the CPU controller refers to the management table of FIG. 12 described later, and checks the attributes of the logical volume belonging to the pool (6006). As a result of this check, it can be determined what type of data is stored by the pool allocated to the access destination of the virtual volume accessed by the host (6007 to 6009).

Next, the data controller 308 selects data read units (data stripe size) from the storage device. The data stripe size in the event that the group attribute is text is selected as small (6006), in the event that the group attribute is block, the stripe size of the data storage sub-system is selected as small to medium (6010), and in the event that the group attribute is large sized data, the text stripe size is selected as large (6011). It is therefore possible to decide the optimum data read units for every data type because the storage control apparatus can recognize the group attributes.

Next, the CPU controller refers to the table of FIG. 12 and determines that the pool volume attribute is online (6013), archive (active) (6014), or archive (non-active) (6015). In the event that the pool volume is non-active, the power supply of the storage device supplying storage regions to the archive volume via the device interface 303 at the pool volume is turned on, i.e. the archive volume is changed to active (6016), and the attribute of the pool volume in the table of FIG. 12 is changed from non-active to active and stored in the meta-information memory (6017). The power supply of the storage device corresponding to the online volume and the archive volume (active) is put to on.

The CPU controller 304 and the data transfer controller 302 recognizes transfer length parameters for data transferred from the storage disc to the cache memory according to the group attribute of the pool volume (6018), and writes data from the storage disc to the cache memory based on this parameter (6019).

Figure 18:
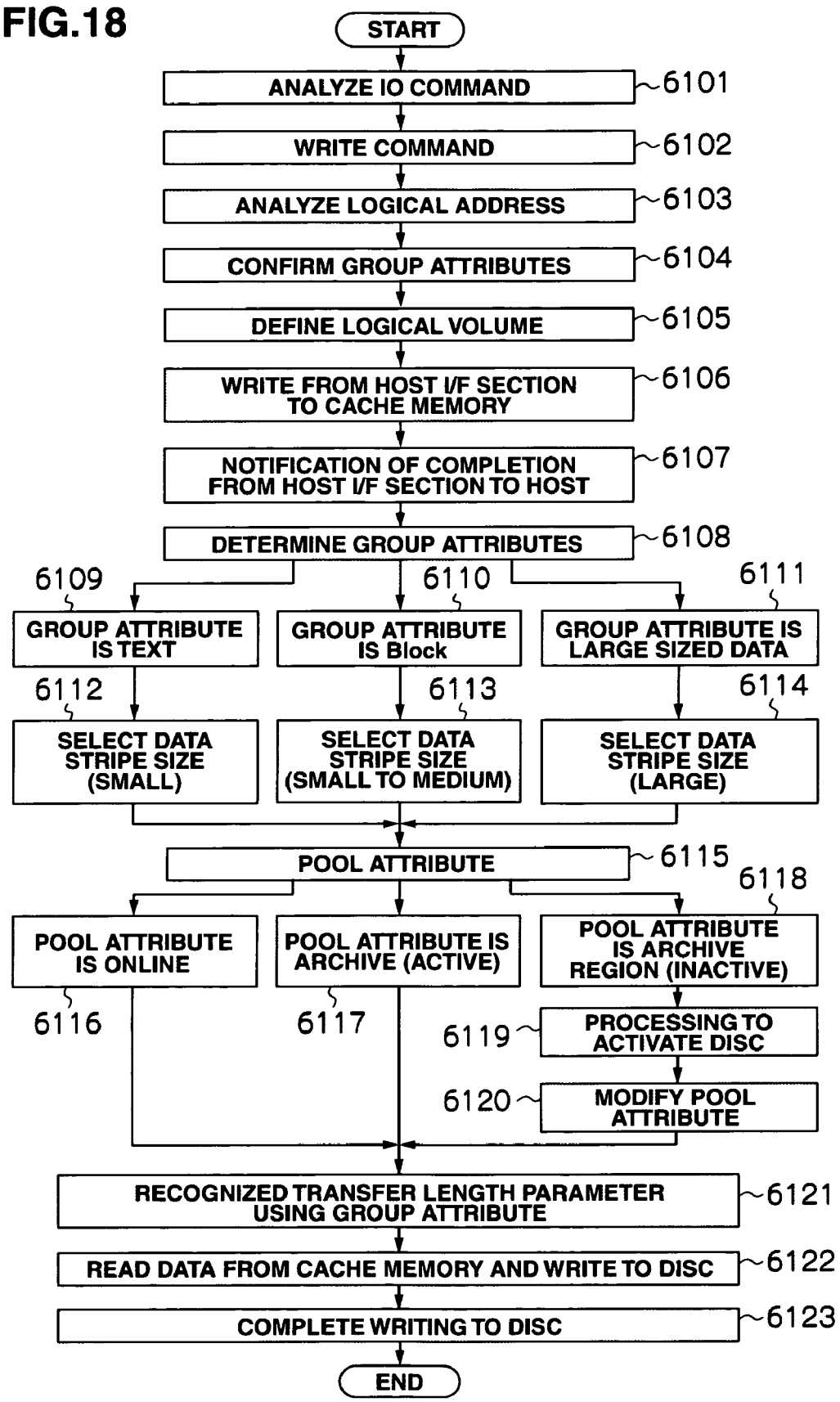
FIG. 18 is a flowchart showing the operation of storage control apparatus while storage control apparatus receives a write command from upper order apparatus (host)

FIG. 18 is a flowchart showing the operation of storage control apparatus while storage control apparatus receives a write command from upper order apparatus (host). The CPU controller 304 analyzes an IO command issued by the host (6101), and when a read command is recognized (6102), the logical address of the virtual volume accessed by the host is analyzed (6103). Next, the CPU controller checks data frames (FIG. 4) from the host and recognizes data group attributes (6104).

The CPU controller then refers to the control table shown in FIG. 11 and determines a corresponding pool region and logical volume (SLU) from the address of the former virtual volume the host issued a read command for (6105). Next, data transfer controller 302 receives write data from host interface controller 301 and writes this to cache memory (6106). Next, the data transfer controller sends notification of data write completion from host interface controller 301 to the host (6107).

Next, the CPU controller 304 checks group attributes of the write data (6108). As a result of this check, it is then possible to determine the type of data of the write data from the host (6109 to 6111). Next, the CPU controller selects data read units (data stripe size) from the host for every data type. The data stripe size in the event that the group attribute is text is selected as small (6112), in the event that the group attribute is block, the stripe size of the data storage sub-system is selected as small to medium (6113), and in the event that the group attribute is large sized data, the text stripe size is selected as large (6114).

Next, the CPU controller refers to group attribute 404B of FIG. 4, determines the group attribute of the write data (6115), and determines the pool attribute to be online (6116), archive (active) (6117), or archive (non-active) (6118). In the event that the pool attribute is archive (non-active), the power supply of the storage device supplying storage regions to the archive volume via the device interface controller 303 at the pool volume is turned on, i.e. the archive volume is changed to active (6119), and the attribute of the pool volume in the table of FIG. 12 is changed from non-active to active and stored in the memory 305 (6120). The power supply of the storage device corresponding to the online volume and the archive volume (active) is put to on.

The CPU controller 304 recognizes transfer length parameters for data transferred to the storage disc from the cache memory according to the group attribute of the pool volume (6121), reads in data from the cache memory and writes this to the cache memory based on this parameter (6122, 6123).

Figure 19:
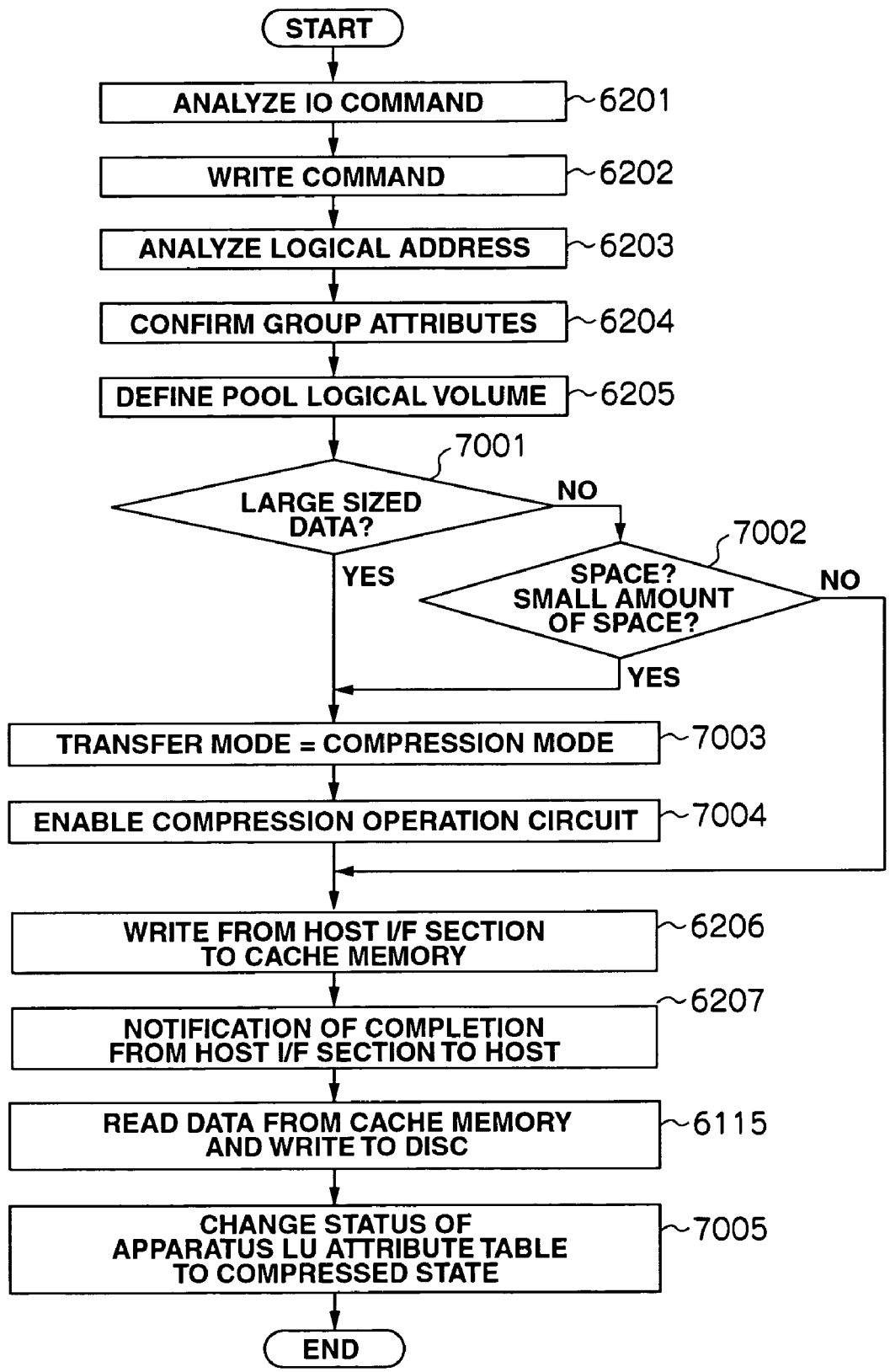
FIG. 19 is a flowchart of the case where storage control apparatus compresses large sized data and writes this data to a storage device in the event that data to be written from upper order apparatus to storage control apparatus is large sized data.

FIG. 19 is a flowchart of the case where storage control apparatus compresses large sized data and writes this data to a storage device in the event that data to be written from upper order apparatus to storage control apparatus is large sized data. The CPU controller 304 analyzes an IO command issued by the host (6201), and when a read command is recognized (6202), the logical address of the virtual volume accessed by the host is analyzed (6203).

Next, the CPU controller recognizes the group attribute 404A of the data frame (FIG. 3) sent to the host interface controller 301 from the host and confirms the data group attribute (6204A). After this, the CPU controller refers to the control table shown in FIG. 11 and determines a corresponding pool region and logical volume (SLU) from the address of the former virtual volume the host issued a read command for (6205).

Next, the CPU controller checks whether write data from the host is large sized data (7001), and in the event that the write data is not large sized data, it is determined whether or not the empty capacity of the cache memory is low (7002). In the event that the write data is large sized data, or in the event that the write data is not large sized data but there is no space in the cache memory, the data operation section 309 puts the data transfer mode for data from the cache memory to the storage disc to compression mode (7003), and the compression operation circuit 403 is put to an enable state.

In the event that there is no space in the cache memory or in the event of light data that is not large sized data that is not compressed or in the case of large sized data, the CPU controller compresses the data, and writes data from the host interface controller 301 to the cache memory 306 (6206). The data transfer controller then reports the completion of writing of the write data to the host by the host interface controller to the CPU controller.

Next, the data transfer controller 302 reads write data from the cache memory 306 and writes this to a storage disc (6215). Next, Status shown in FIG. 12 is changed for the logical volume (SLU) of the pool the write data is written to, and the control table after changing is newly recorded to the memory 305. According to this flowchart, the storage control apparatus discriminates large sized data from other data and compresses and stores this data in a storage device. As a result, storage resources of the storage control apparatus can be utilized in a more effective manner.

Figure 20:
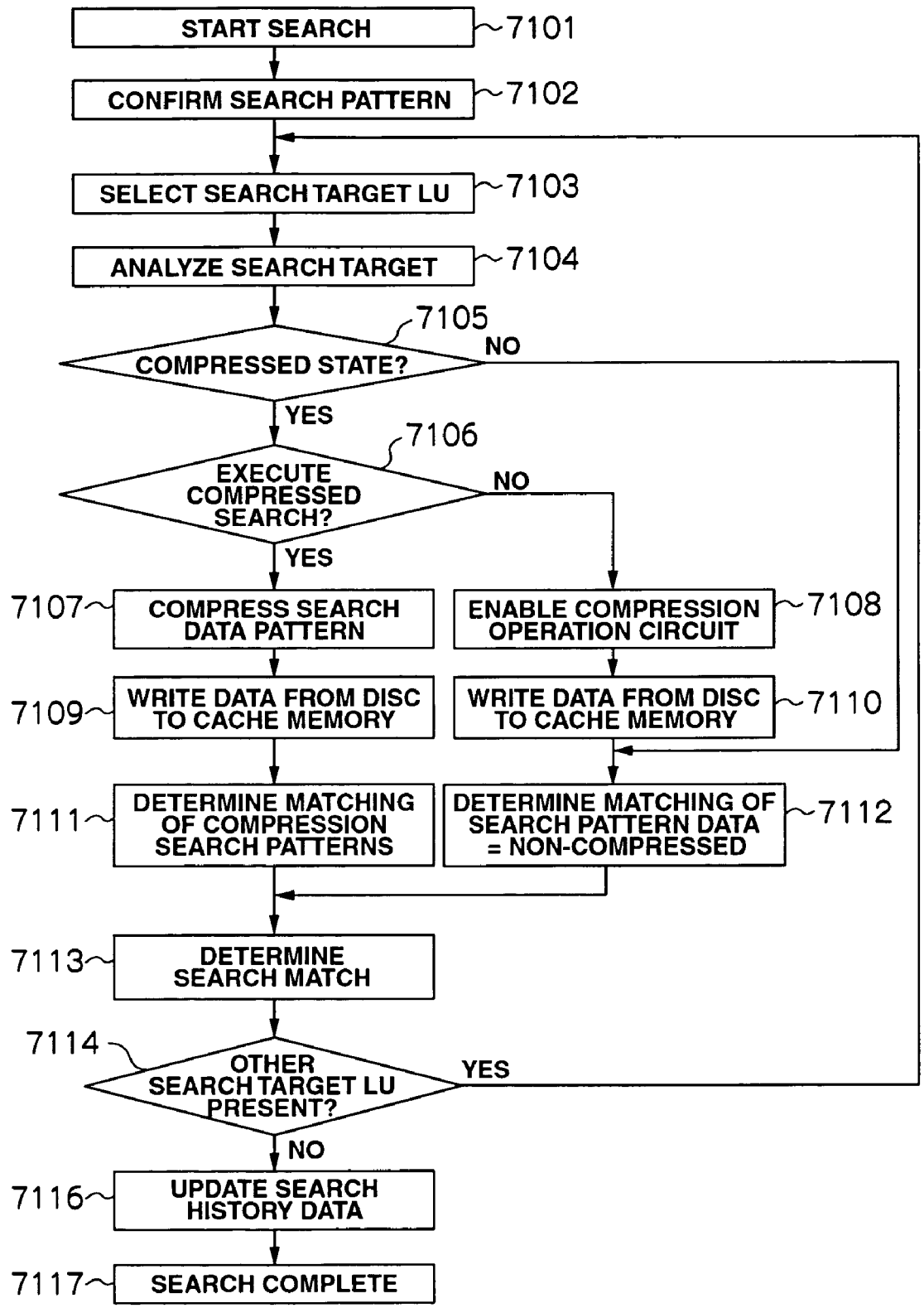
FIG. 20 is a flowchart for the case where storage control apparatus receives a search command from a host so that a search for data stored in the storage device is carried out.

FIG. 20 is a flowchart for the case where storage control apparatus receives a search command from a host so that a search for data stored in the storage device is carried out. When a search engine 501 of the storage control apparatus receives a search command from the host, a search is started (7101). Next, the search engine confirms the procedure (search pattern) for the search for searches where there is a request from the host based on a search command (7102). As described previously, designation of the index (keyword) for searching and selection of the virtual volume constituting a search target is contained in the search pattern.

Next, the search engine selects the virtual volume constituting a search target (7013) based on a search instruction sent to the host interface controller. The host is capable of selecting a virtual volume constituting a search target from the plurality of virtual volumes, and is capable of specifying or selecting the sub-logical volume belonging to a lower hierarchical layer of the virtual volume as a search target. Further, the host is capable of selecting the type of data to be searched.

The storage control apparatus then recognizes the region constituting a search target based on the search command (7104), and searches for whether or not there is data being searched in this region. The search engine analyzes the control table of FIG. 12 as to whether or not the storage region (logical volume) constituting the search target is compressed, and determines the presence or absence of compression (7105). In the event that data is compressed, a matching search (7112) is carried out on all of the pool storage regions corresponding to the index data and the virtual volume constituting a search target without compressing search pattern data, i.e. index data such as keywords for search use designated at the search engine by the host.

In the event that data is not compressed, the search engine compresses search data and determined whether or not to execute the search (7106). In the event that a search is executed, the search engine compresses the pattern for the search data (7107), and the data transfer controller 302 sequentially reads out and writes in compressed data constituting search target candidates at the cache memory from the storage disc.

The search engine then sequentially determines the presence or absence of matching of compressed data and compressed keywords written to the cache memory (7113). In the event that searching is complete for one virtual volume, it is determined whether or not another virtual volume (LU) to be searched is present, and in the event that another virtual volume is present, processing of step 7103 onwards is repeatedly executed for the virtual volume constituting the next search target. In the event that there is no other virtual volume to be searched, the search engine updates search log data that is history relating to searches, and records the table storing the search log data after updating in the memory 305. After this, the search engine ends the search (7117).

In step 7106, when execution of compression searching does not take place, the compression operation circuit 403 is put to enable (7108), the compressed data of the storage disc is released from a compressed state by the compression operation circuit 403NA, and is written to cache memory (7110). Next, the search engine carries out a search for matching with keywords that are not compressed for data that is not compressed as described previously. According to the flowchart of FIG. 20, it is possible for the storage control apparatus to carry out searching based on index information from the host even when data constituting a search target is not stored in a compressed volume.

FIG. 21 is an information table for storing history relating to results of searches carried out by storage control apparatus. A search history number is set every time a search command is sent to the storage control apparatus from the host, and a date and index number are set to each search history number. The index number corresponds to the index table (FIG. 14 to FIG. 16). At an index corresponding to this index number, the number of storage regions (segments) matching with results of a search by the search engine of the storage sub-system is a hit number SG This storage region is specified using a logical volume number (SLU#) and a segment number within a logical volume (SG#). Every time a search command is received from the host, the search engine of the storage control apparatus adds the search results to the information table and stores this in memory 305.

Figure 22:
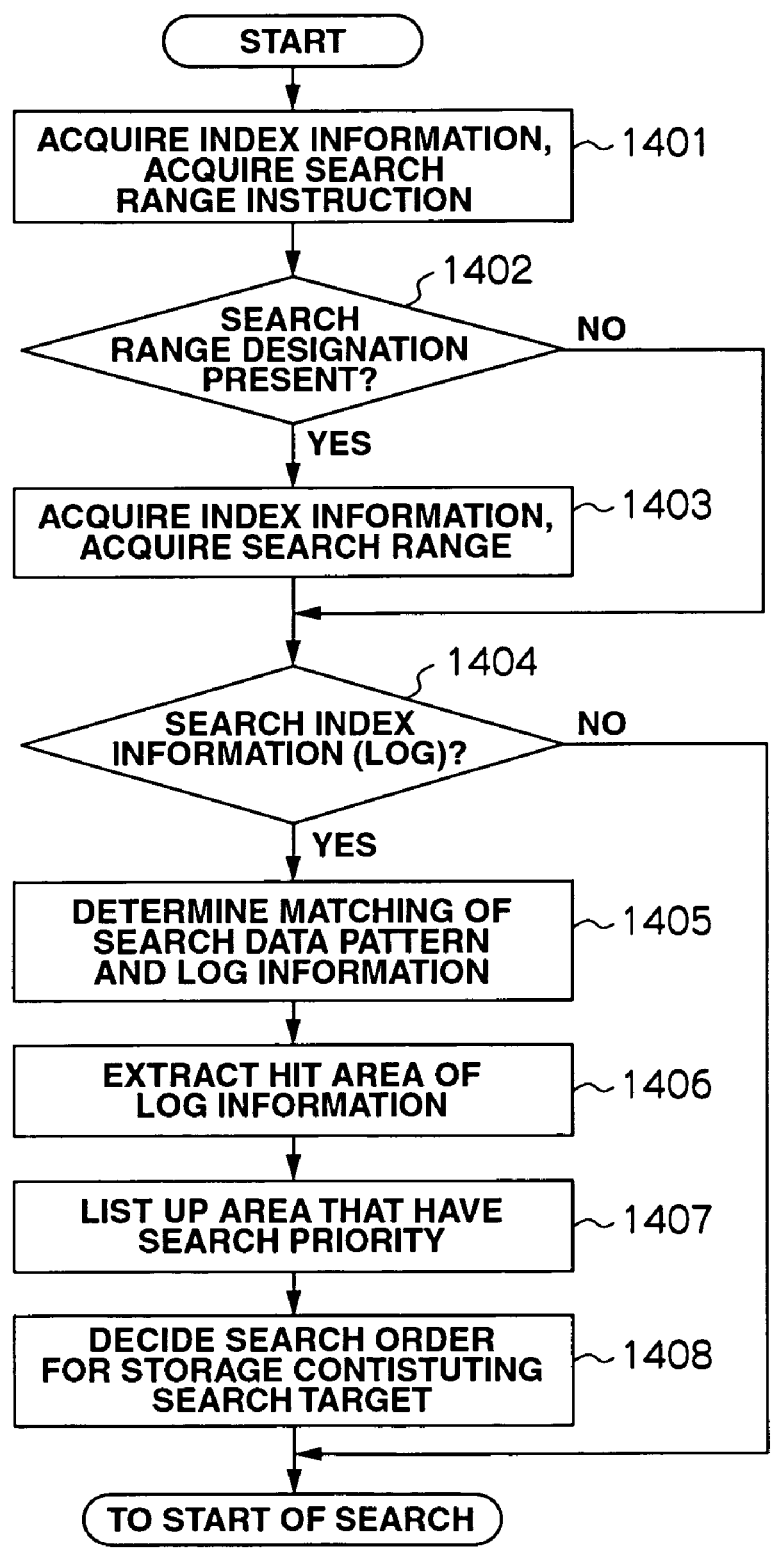
FIG. 22 is a flowchart for when storage control apparatus receives a search command from a host, refers to a search log information table shown in FIG. 21, and decides priority during searching for storage regions to be searched.

FIG. 22 is a flowchart for when storage control apparatus receives a search command from a host, refers to a search log information table shown in FIG. 21, and decides priority during searching for storage regions to be searched. The search engine of the storage control apparatus then acquires keyword/search range information from the host (1401). Next, the search engine checks whether or not the range of the search log has been designated from the host (1402). When this is the case, the range of the log to be searched for index information is acquired (1403).

The search engine then determines whether or not the log (FIG. 21) is searched as a result of a search command from the host (1404). If this is determined not to be the case, the search is started without referring to past search logs. On the other hand, in the event that this is determined to be the case, the search engine determines the presence or absence of matching of the search data pattern (keyword) and the log information shown in FIG. 21 (1405). The search engine then compares the search data with the keyword decided by FIG. 14 to FIG. 16 using the index (index number) at the log information table, and extracts hit areas where the content of the keyword matches either completely or partially (1406). This hit area is specified by the search log number as shown in FIG. 21. In the event that a range is not specified by the search engine in the case that a log range to be searched is designated in step 1403, the determination of step 1406 is repeated for the range of all of the logs. The log range is determined by the data or the index number.

The search engine then obtains the number of storage regions for each hit area using step 1406, and carries out a search in order giving priority to areas with the largest number of storage regions. As shown in FIG. 21, the storage regions are specified by a combination of logical volume numbers (SLU numbers) and segment numbers (SG numbers). The search engine then lists up the areas to be searched in order of searching priority (1407). The search engine then decides the order of searching the storage regions belonging to an area based on the priority of the area.

Figure 23:
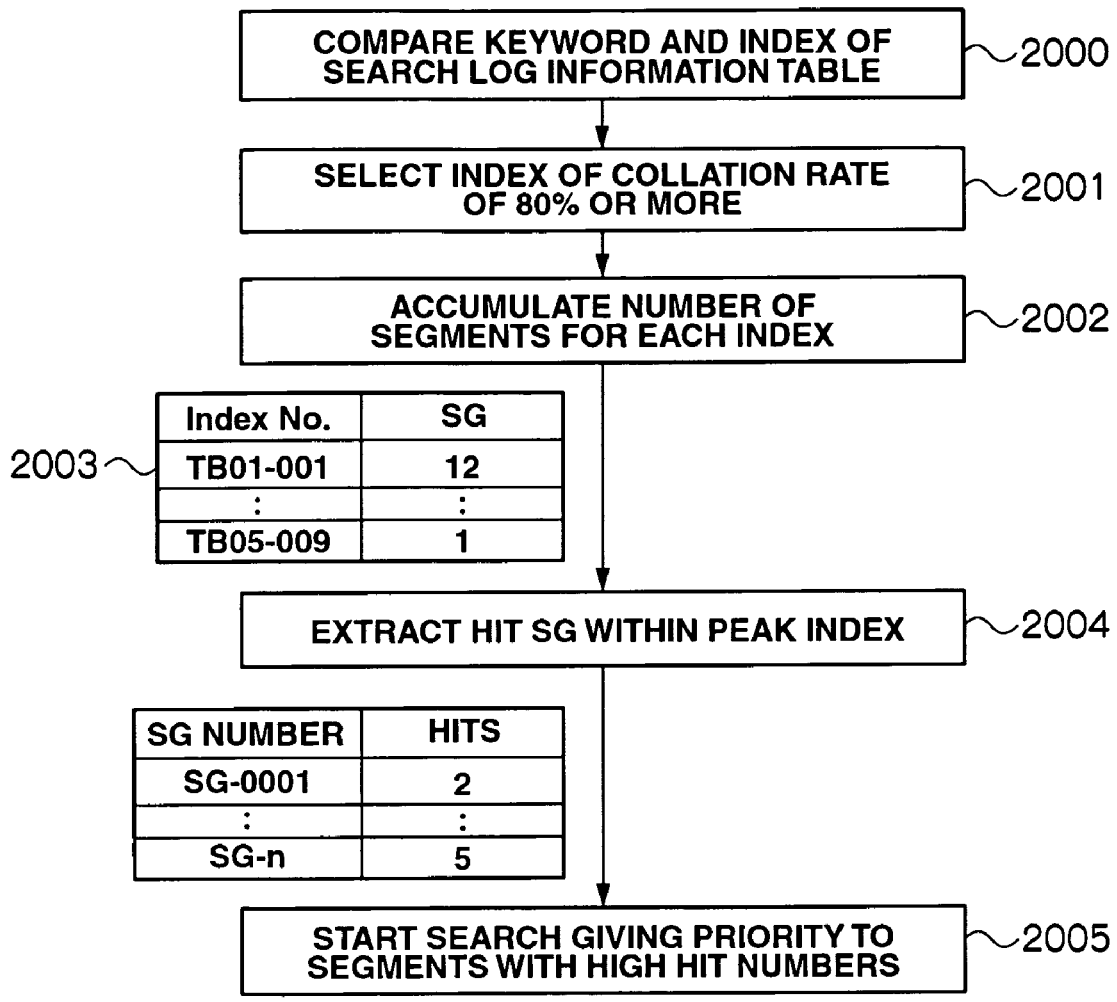
FIG. 23 is a flowchart of how the search engine decides search priority areas of FIG. 22.

FIG. 23 is a flowchart of how the search engine decides search priority areas of FIG. 22. The search engine then collates the keyword pattern (hit data distribution) and index pattern (hit data distribution) of the log information table (index of FIG. 21) (2001). The search engine then selects an index (plurality of index numbers of FIG. 21) with a collation rate (hit data matching rate for between both patterns) of 80% or more.

Next, with regards to each index (index number), the search engine refers to the information table of FIG. 21, and performs calculations to accumulate the number of segments determined as hits in the searches (2002). The search engine puts the results of the accumulation calculations into the form of a table (2003), and records this in a predetermined area of the memory. The search engine then searches the table 2003, takes the index with the largest number of accumulated segments as a peak index, and extracts the segments belonging to this peak index (2004). Next, the search engine accumulates and calculates the number of hits for the segments within the table of 2003, and a table (2004) for the number of hits accumulated every segment is made. The plot shown in FIG. 24 is obtained when a table of 2004 is put into the form of a graph (histogram).

Figure 24:
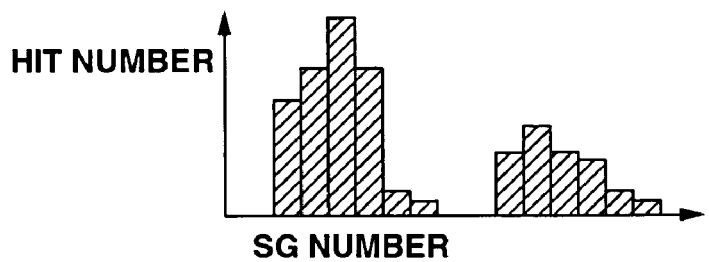
FIG. 24 is a graph of a table for the number of hits accumulated every segment of a pool.

Referring to FIG. 24, the search engine starts a search giving priority to segments with the highest number of hits.

The search then, for example, sends all or part of a data portion 402 in a frame shown in FIG. 4 to the storage control apparatus, and the storage control apparatus determines whether or not data within segments matches with sent data in accordance with the order of the search priority of the segments obtained in step 2005. When the storage control apparatus sends search results to the host, the display apparatus of the host is capable of displaying the search results on a monitor. In step 2004, when processing for deciding priority with respect to the segments is completed for the peak index, the same processing as in steps 2004 and 2005 is executed for indexes of index numbers where the number of segments hits are determined for is large.

Deciding priority for segments where the number of segments is large is performed by processing the index numbers for all of the index numbers. In this way, it is possible to carry out searching in a short time and in an effective manner and to achieve completion on the side of the storage control apparatus by deciding the storage region to be searched for data before starting a read data search utilizing the keywords.

Correlation of an index contained in a search method sent in accompaniment with a search request from the upper order apparatus to the storage control apparatus and an index stored in a management table related to the search log the memory of the storage control apparatus is equipped with is performed by comparing text data of the indexes. The correlation takes whether the index data matches or is similar as a reference. The determination of similarity may be, for example, taken to be as follows. A flag region relating to the relationship of similarity between fellow indexes is provided at one (entry) record of the index table. The storage control apparatus searches as to whether index data similar to this data is present using the memory information management table based on index data from the upper order apparatus.

Figure 25:
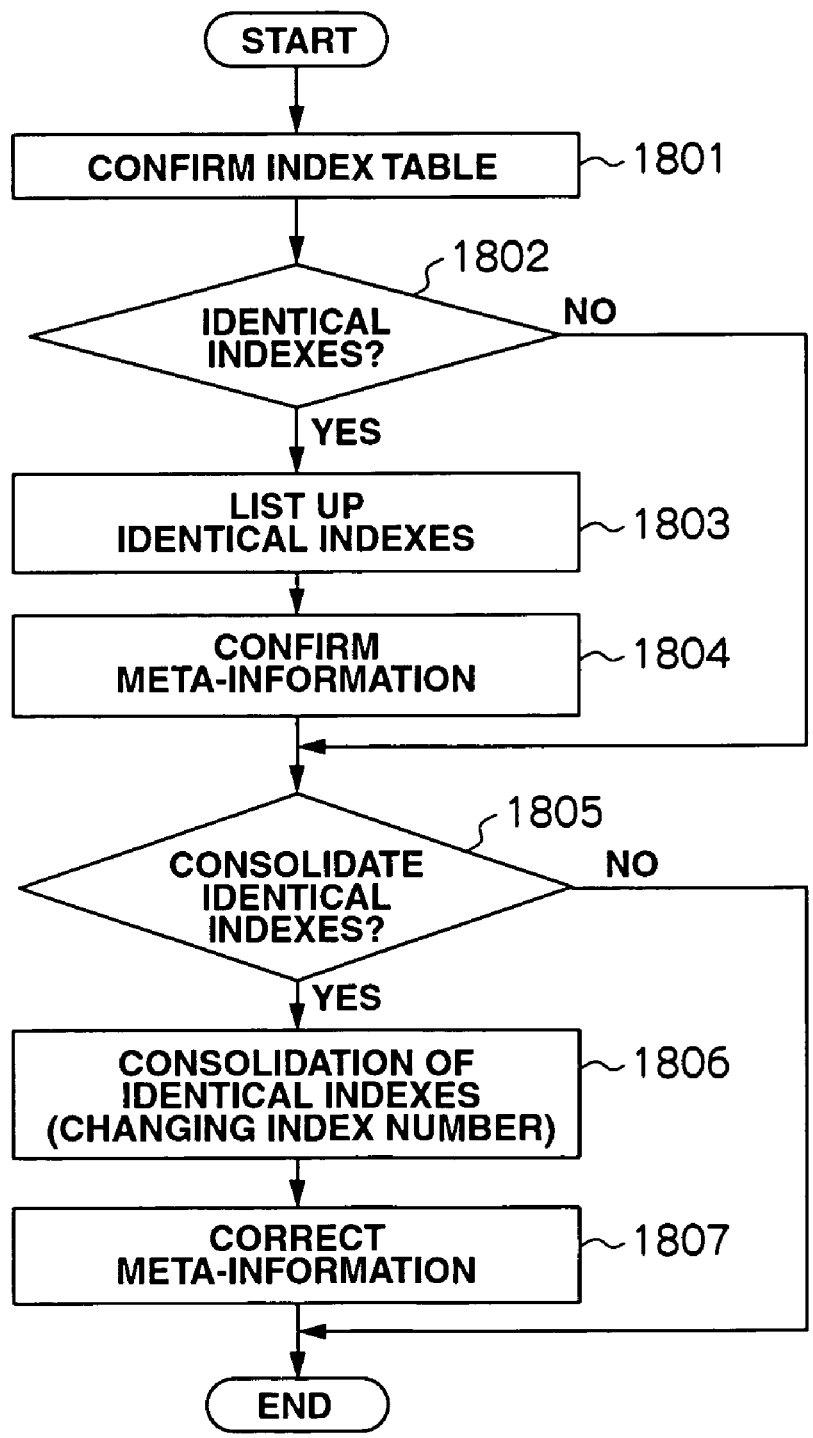
FIG. 25 is a flowchart for processing index information stored in storage control apparatus.

FIG. 25 is a flowchart for processing index information stored in storage control apparatus. The search engine is able to effectively proceed with searches gathering index information that does not increase more than necessary by periodically executing the procedure in this flowchart.

In step 1801, the search engine confirms the index files constituting the index table (FIG. 14, FIG. 15, FIG. 16). The search engine then determines whether the same indexes exist for the index files (1802). In the event that this is the case, the same indexes are listed up (1803).

Next, the search engine recognizes the meta-information table shown in FIG. 11(1804). After this, the administrator determines whether or not to consolidate the same indexes, and instructs the storage control apparatus of the results of the determination via the management apparatus. If this is determined not to be the case, the search engine consolidates the same indexes, the index numbers for FIG. 14 to FIG. 16 are deleted, and index numbers are changed so as to consolidate other index numbers corresponding to the same index numbers. Next, the index numbers of the meta-information table (FIG. 11 to FIG. 13) is then modified based on the index table after modification.

Figure 26:
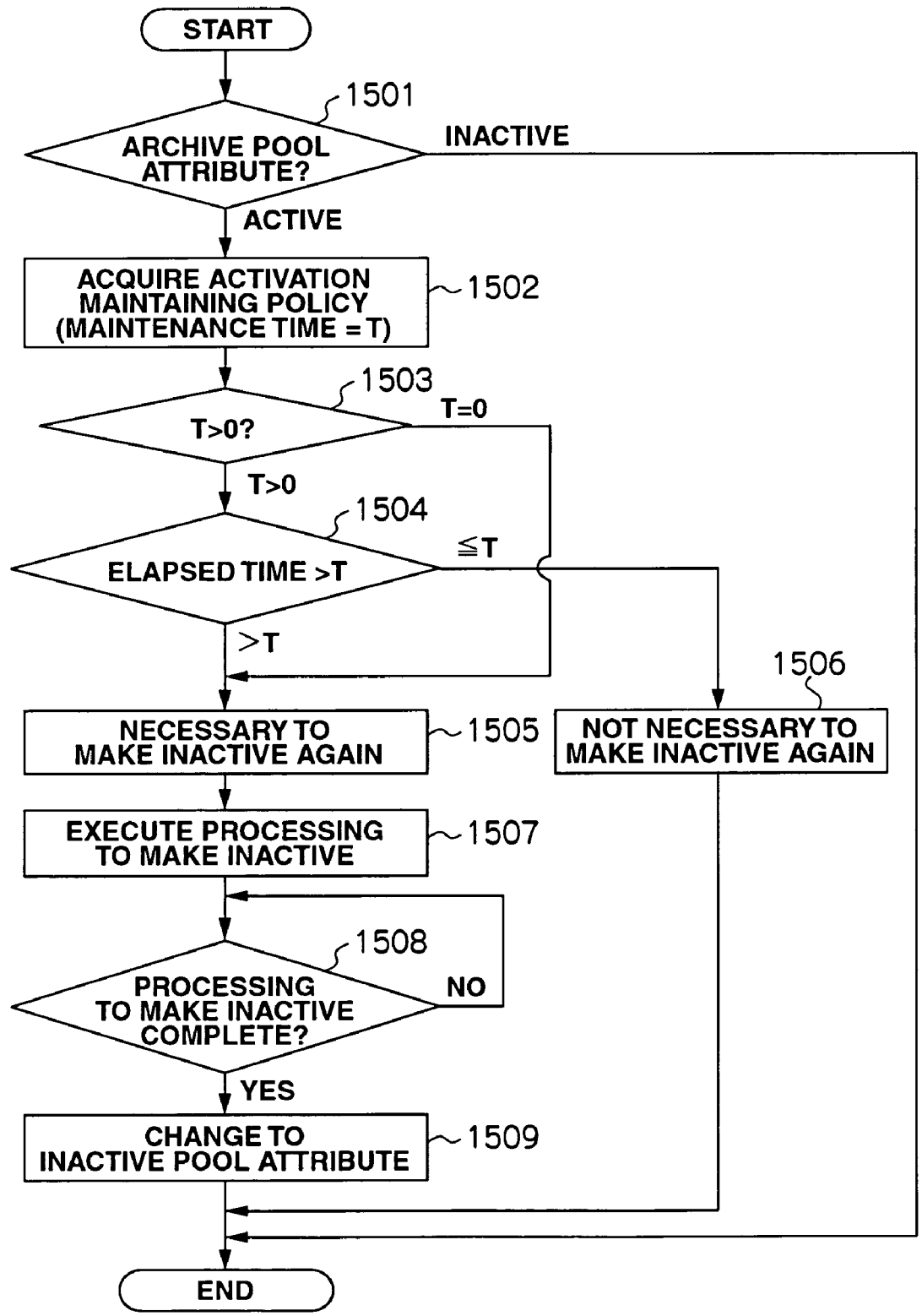
FIG. 26 is a flowchart of a process for whether or not to return an attribute to its original form once again executed by storage control apparatus after changing an attribute for a pool volume of a storage region from being archived (non-active) to being un-archived (active)

FIG. 26 is a flowchart of a process for whether or not to return an attribute to its original form once again executed by storage control apparatus after changing an attribute for a pool volume of a storage region from being archived (non-active) to being un-archived (active). When there is a write/read access or an access with the purpose of searching from a host to a storage region belonging to a pool volume of an non-active attribute, the storage control apparatus has to first put the storage device to an active state.

The CPU controller then periodically executes the process in the flowchart of FIG. 26 for storage regions (logical volumes indicated by SLU in FIG. 12) where the archive pool attribute has gone from non-active to active. The data controller then determines archive pool attributes for this recording region using the information table of FIG. 12. When the attribute of the archive pool is changed, the attribute after changing is recorded in the table of FIG. 12.

The CPU controller then checks archive pool attributes of storage regions where the archive pool attributes have gone from non-active to active (1501). In the event that the attribute is non-active, the process ends, while in the event that the attribute is active, in step 1502, the attribute is put from non-active to active, and information relating to a policy for maintaining an active state is acquired by the data controller from control information recorded in memory (1502). Here, the "policy" is the time (T) the attribute is held at an active state.

In the event that the maintained time is not "0"(1503), in step 1504, the CPU controller compares the time from the attribute goes from non-active to active and the maintained time (T), and in the event that the time passes has not reached the maintained time, it is determined that it is not necessary to once again put the attribute to non-active (1506), and the process of the flowchart ends. On the other hand, in the event that the elapsed time exceeds the maintained time, it is determined that it is necessary to once again put the attribute to non-active (1505). In step 1503, in the event that the maintained time (T) is "0", it is not necessary to keep the attribute active, and step 1505 is jumped to.

The CPU controller then carries out processing to put the attribute from active to non-active, i.e. the power supply for the storage device supplying storage regions to the logical volume (SLU of FIG. 12) for which the attribute is to be changed is turned off (1507). Next, it is determined whether or not processing for putting non-active is complete (1508). Next, the attribute (Status) of the information table shown in FIG. 12 is changed to a flag value indicating that the archive pool attribute is non-active, and the information table after changing is recorded in the meta-data memory 305 (1509). According to this flowchart, it is important to prevent increases in power consumed by drives of the storage device by having the attribute for the archive pool continue in an active state.

Figure 27:
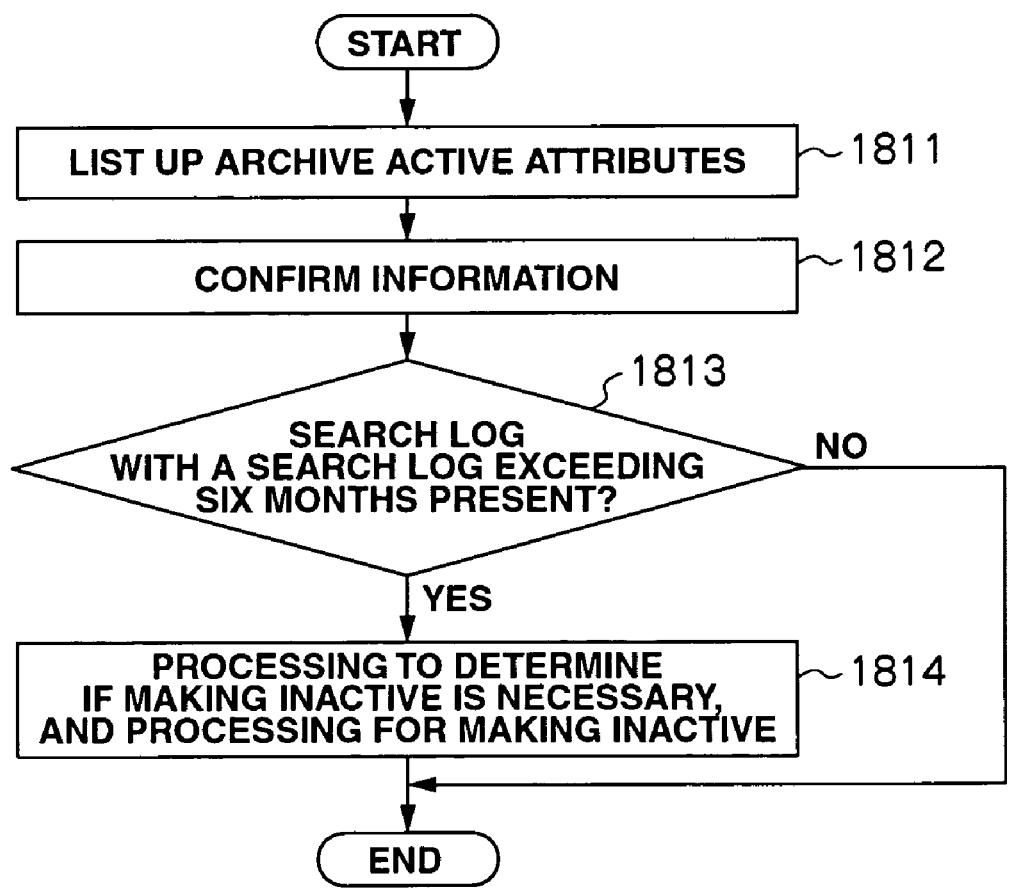
FIG. 27 is a flowchart for when storage control apparatus checks whether or not to maintain this active state for a storage region where an attribute for an archived pool is active.

FIG. 27 is a flowchart for when storage control apparatus checks whether or not to maintain this active state for a storage region where an attribute for an archived pool is active. The CPU controller then refers to the information table (FIG. 12) stored in the control memory, and lists up attributes relating to the pool of the logical volumes belonging to the archive pool being active/non-active (1811). The data controller 304 then refers to the information table relating to the search log shown in FIG. 21 and confirms the search log (1812).

The CPU controller then refers to the search log information, and checks whether or not search history (search log numbers) where the search log (date) exceeds six months exists (1814). In the event that this search log number exists, the information table shown in FIG. 21 is referred to, the pool side logical volume number (SLU) contained in an item of this search log number is specified. Further, the information table shown in FIG. 11 is referred to, and a logical volume number where the pool attribute is active corresponding to this logical volume number is extracted. The CPU controller then determines the item for which it is intended to put the pool attribute corresponding to this logical volume is to be put from active to non-active, and the power supplies for all of the storage devices having the storage region contained in this logical volume is put to off (1814). As a result of the processing described above, it is possible to suppress the power consumption of the storage device.

Figure 28:
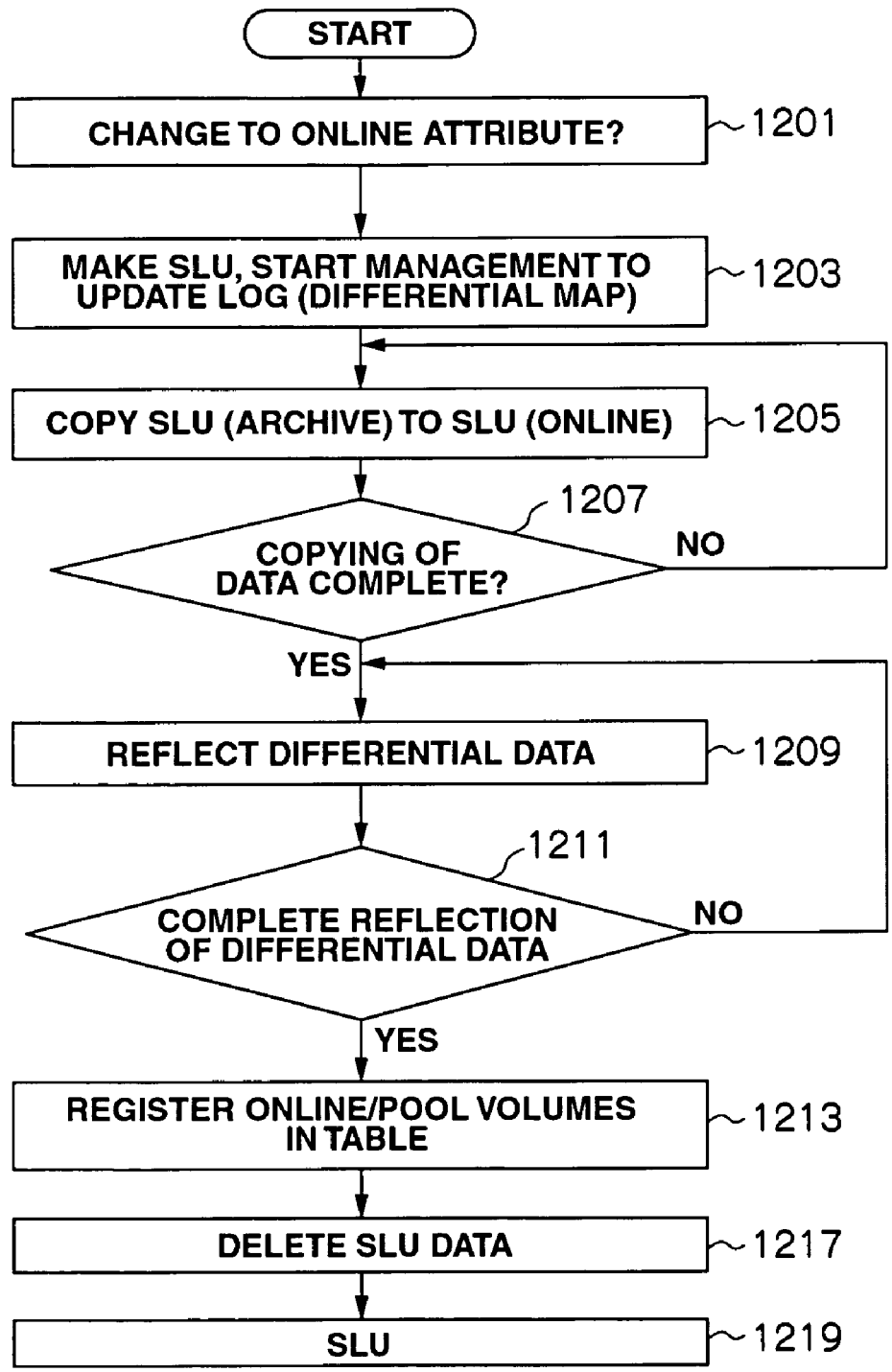
FIG. 28 is a flowchart for changing attributes of a volume.

FIG. 28 is a flowchart for changing attributes of a volume. The CPU controller then changes the archive volume to an online volume. In step 1201, the CPU controller 304 determines whether to change the attribute of the volume constituting the target from archive to online. The CPU controller then makes this determination based on accesses from the host or by itself by analyzing accesses from the host. The CPU controller then makes a sub-logical volume (SLU) at the online pool ("12" of FIG. 1). This is executed for the information tables of FIG. 11 and FIG. 12. Further, the CPU controller starts to make the tables shown in FIG. 13 and FIG. 21 for this logical volume (SLU), i.e. starts to carry out searching based on the search command from the upper order apparatus (1203).

The CPU controller then copies data to a volume (SLU2) belonging to an online pool newly made from the volume (SLU1) of the archive pool constituting the target of changing the attribute (1205). The CPU controller then determines whether or not copying of data is complete in step 1207. The process of step 1205 is continued until copying of the data is complete. After copying between the volumes is complete, the CPU controller further reflects differential data at the logical volume (SLU2) of the online pool. Next, the CPU controller records SLU2 in the information table described previously (1213). After this, the CPU controller determines whether or not deletion of the data stored in SLU1 is necessary. In the event that this is the case, the data stored in SLU1 is deleted, this SLU1 is deleted from the information table described previously, and the storage region of SLU1 is released from the virtual volume. FIG. 28 is a description of copying data for the logical volume of the archive pool to a logical volume of an online pool but the reverse is similarly possible for FIG. 28.

Figure 29:
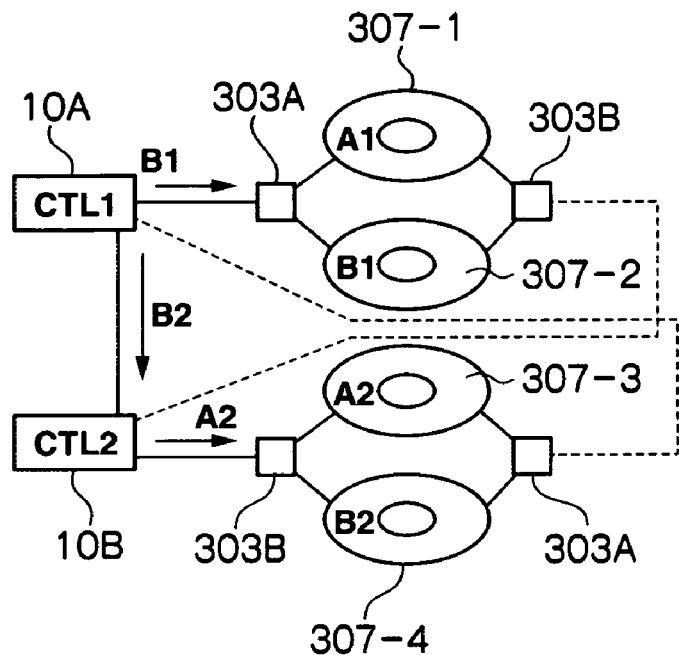
FIG. 29 is a block view schematically showing an example of changing a hardware block configuration of storage control apparatus described in FIG. 6.

FIG. 29 is a block view schematically showing an example of changing a hardware block configuration of storage control apparatus described in FIG. 6. As shown in FIG. 3, the storage control apparatus is equipped with two controllers, taken to be 10A and 10B, respectively. Numeral 307-1 and 307-2 are physical volumes of the controller 10A side, and numeral 307-3 and 307-4 are physical volumes of the controller 10B side. Accessing is also possible to the physical volume on the side of the controller on one side from the controller of the other side via the disc interface controller 303 of the controller of the other side. The controller 10A supplies two virtual volumes A1 and B1 to the host and controller 10B supplies two virtual volumes A2 and B2 to the host. The pool for the virtual volume A1 is implemented using the physical volume 307-1, the pool for the virtual volume B1 is implemented using physical volume 307-2, the pool for the virtual volume A2 is implemented using the physical volume 307-3, and the pool for the virtual volume B2 is implemented using physical volume 307-4.

It is therefore possible for the host to access the physical volumes from either controller. Normally, the physical volumes 307-1 and 307-2 are then accessed from a disc interface controller 303A of the type of controller 10A. In the event that there is an access fault from the host at the side of the controller 10A, accessing of the physical volumes 307-1 and 307-2 takes place from the side of a disc interface controller 303B of the controller 10B. The same is also shown in FIG. 29 for the physical volumes 307-3 and 307-4.

Figure 30:
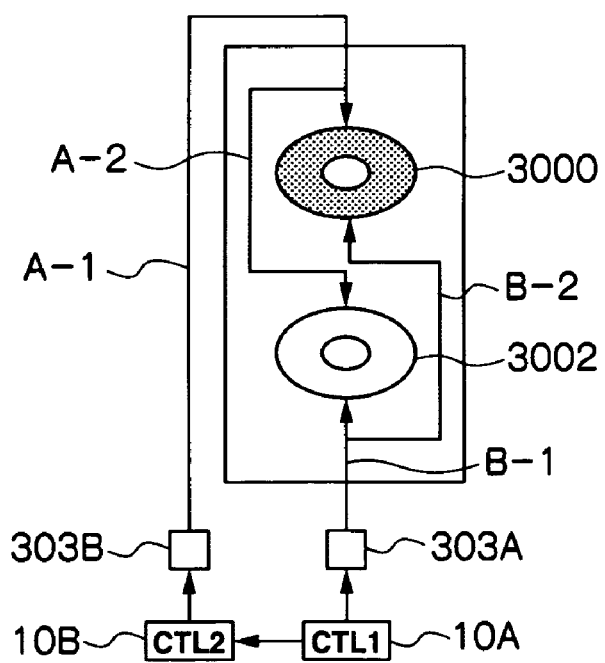
FIG. 30 is a block view of a storage control system showing the case where one storage device is made up of an archive HDD and an online HDD.

FIG. 30 is a further example, and gives the case where one storage device is constituted by a pair consisting of archive HDD 3000 and online HDD 3002. The controller 10A is capable of accessing hard disc 3002 for online pool use via path B-1 and is capable of accessing the hard disc 3000 for archive use via path B-2. The same also applies for controller 10B. A storage device supplying the online volumes can also be non-volatile semiconductor memory such as flash memory etc. as described previously, rather than the online HDD.

Figure 31A:
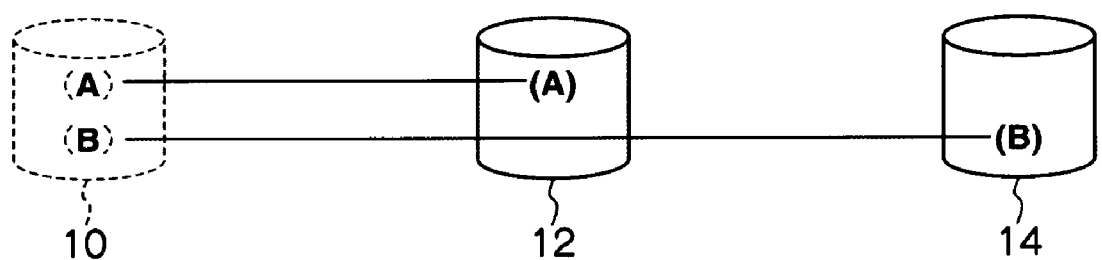
FIG. 31 is a block view for a further modified example showing a storage operation of the storage control system.
Figure 31B:
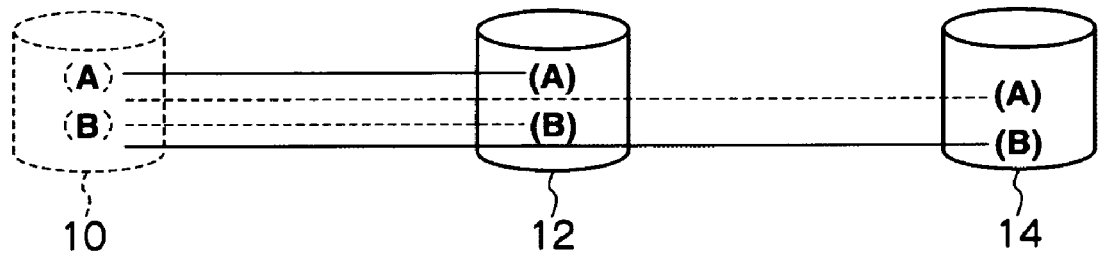

FIG. 31(1) indicates that online data (A) is stored in online pool volume 12, and indicates that archive data (B) is stored in the volume of the archive pool. Numeral 10 is a virtual volume. FIG. 31(2) indicates a situation where buffer data of archive data (B) is stored in the online volume, and back-up data for online data (A) is stored in the archive volume.

Figure 32:
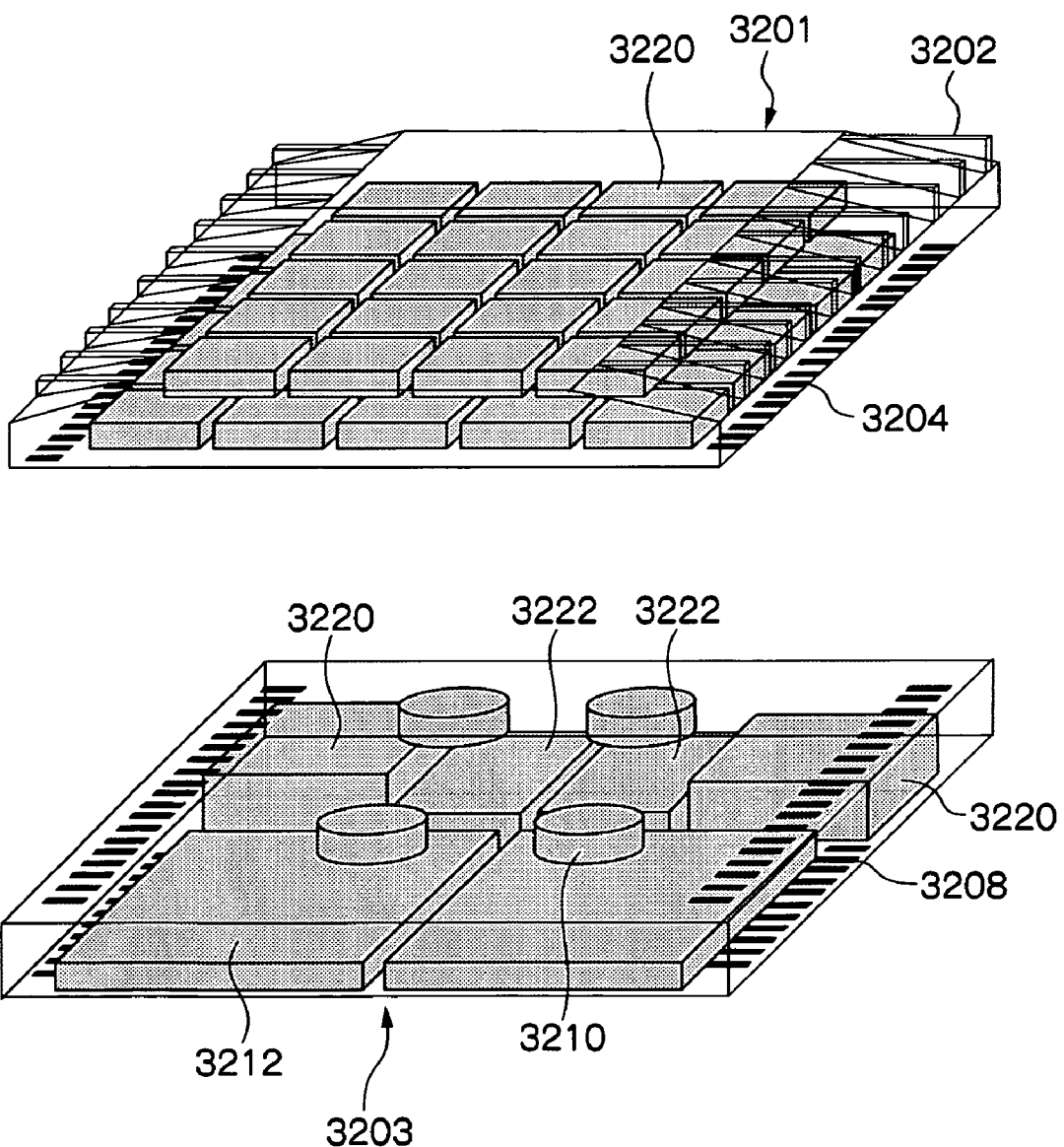
FIG. 32 is a perspective view showing an example of a further configuration for storage control apparatus.

FIG. 32 shows a further example of storage control apparatus. This storage apparatus is configured with the controller and the storage drive unit respectively on an integrated chassis. Numeral 3201 is a chassis where a plurality of storage devices 3200 are integrated using a structure of metal or resin, etc. A plurality of storage devices are then stored in an array in a plurality of upper and lower stages (in FIG. 32, two stages of an upper and lower stage) over substantially the entire surface of the flat plate-shaped chassis. A plurality of strap-shaped through-holes 3204 are formed at left and right side surfaces of the chassis, and strap-shaped heat-dissipating fins 3202 are formed at left and right side surfaces of the chassis.

Figure 34:
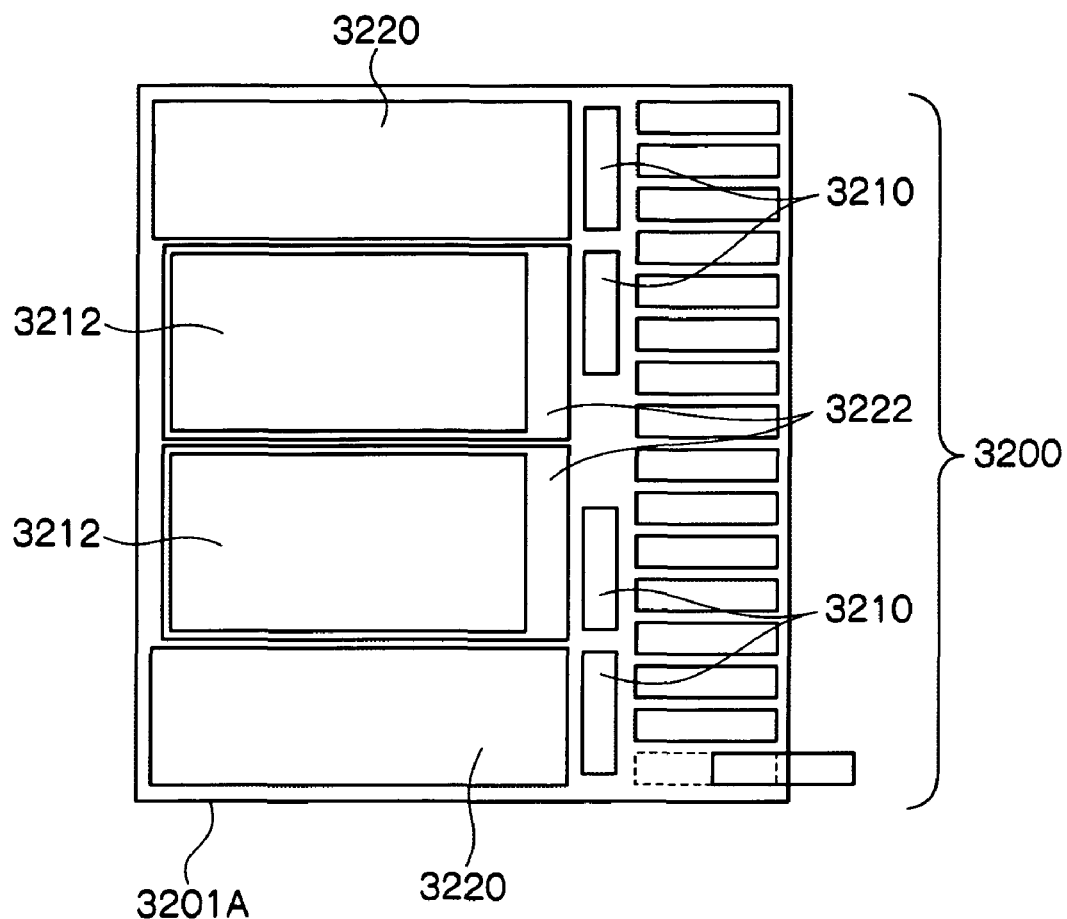
FIG. 34 is a front view of storage control apparatus of the related art.
Figure 35:
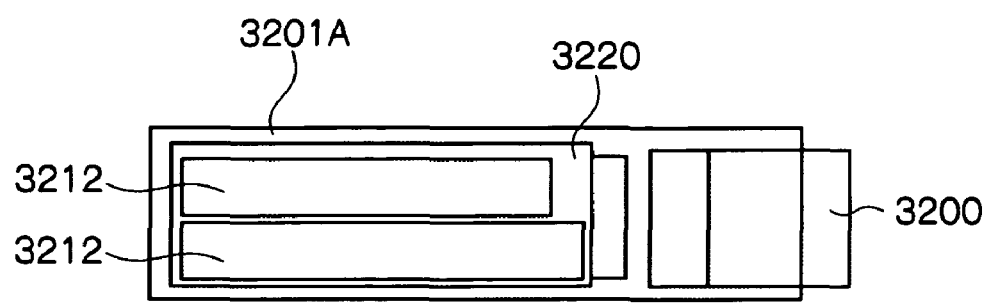
FIG. 35 is a plan view of storage control apparatus of the FIG. 34.

FIG. 34 and FIG. 35 are for illustrating the characteristics of the storage disc-side chassis of FIG. 32 and show a structure for storage control apparatus of the related art. FIG. 34 is a front view of the storage control apparatus of the related art, and FIG. 35 is a plan view. Storage discs 3200 are lined up inclined towards the right side surface of a case 3201A. A controller 3212, power supply 3220 and battery 3222 occupy the center of the casing lined up along the vertical. Cooling apparatus 3210 is provided facing the ends of the storage discs.

In the related art, the storage discs 3200 are allocated to storage regions of specific volumes and are therefore provided so as to be capable of being inserted into and removed from within the casing at an end of the casing as maintenance and changing of discs becomes necessary. However, it is possible to release storage discs from being allocated to volumes by providing virtual volumes to hosts, and mapping any of a plurality of storage discs to a virtual volume according to accesses from the host to the virtual volume.

It is not necessary for the storage discs to be inclined to the end side of the casing for the storage system, and arrangement of the storage discs to the center side of the casing is also possible, and the storage discs can therefore be provided within the casing in high density.

Some of the storage discs within the chassis may also be saved as reserve discs. In the event that some of the discs are faulty, such discs may be replaced by reserve discs that are already within the chassis. A plurality of reserve discs may be held in reserve but if there are no reserve discs, it is possible to change the chassis rather than individual discs.

The controller is also configured within the same chassis 3203. Numerals 3208 are through-holes provided at both ends of the chassis. Numeral 3212 is a control circuit, and numerals 3210 are four cooling fins provided equidistantly across a width-wise direction at the chassis 3203. Numeral 3224 is a power supply unit, and numeral 3222 is a battery. A storage unit-side chassis 3201 is housed within the casing of the storage system on the control chassis 3203.

Figure 33:
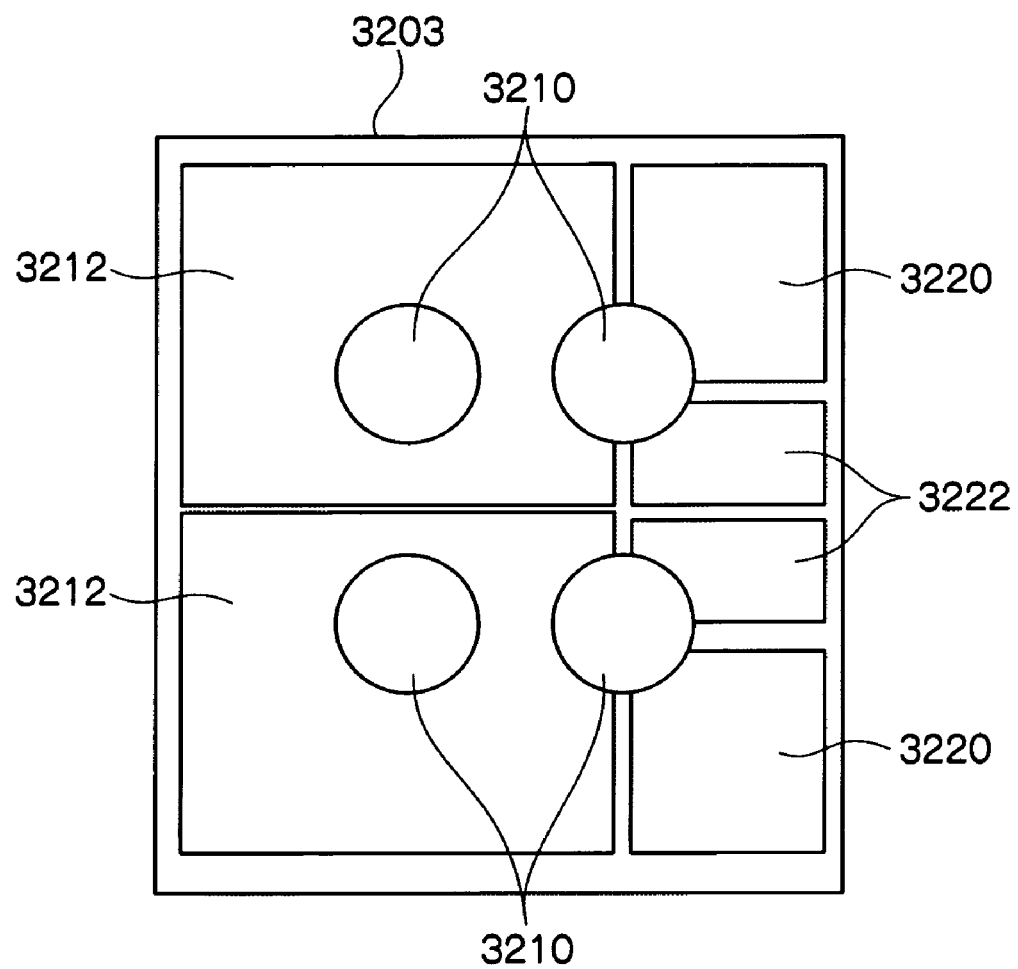
FIG. 33 is a perspective view showing an example where a controller of storage control apparatus of FIG. 32 is configured from an integrated chassis.

As shown in FIG. 33, the fins 3210 cool the whole of the rear surface of the chassis 3201. Namely, according to the configuration of the storage sub-system shown in FIG. 32, storage devices are provided to a high-density, and cooling of the storage devices is also superior. Further, by changing storage devices each chassis, maintenance of the storage devices is no longer necessary, and changing of the storage devices can be achieved in a straightforward manner.

Namely, as shown in FIG. 32, in storage control apparatus using the AOU described above as storage devices, it is not necessary to arrange the plurality of storage discs inclined to an end side of the casing, and utilization of an arrangement region for the storage discs to the center side of the casing is also possible. As a result, a large number of storage discs can be housed within the casing, and the packing density of the storage devices of the storage control apparatus can be raised. Further, the storage regions supplied to the virtual volumes from the storage discs are managed in units of chunks, and chunks can therefore be moved between storage discs. This means that the requirements regarding maintenance and replacement of the storage discs one at a time can be reduced. It is therefore possible for a plurality of storage devices to be mounted on a single integrated chassis, with storage apparatus then being replaced in chassis units. Further, it is also possible for a plurality of cooling apparatus to be provided in a width-wise direction of the casing, so that means for cooling from cooling apparatus can be provided over a broad back face of the plurality of storage devices and cooling efficiency can therefore be improved.

In the above embodiments, an example is shown taking text data, block data, and large sized data as the type of data, but this is by no means limiting, and data may also be classified into types based on the application of data. The above description is merely provided as an example form of the present invention, and the present invention is by no means limited to this form. Modifications within a normal range by one skilled in the art are also permissible to give further embodiments of the present invention.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A storage control apparatus, storing write data in storage devices based on write accesses from an upper order apparatus, and supplying read data of the storage devices to the upper order apparatus based on read accesses from the upper order apparatus, comprising:

a controller providing a virtual volume accessed by the upper order apparatus;

a plurality of storage devices on which a plurality of logical volume are managed thereon by the controller;

a memory for storing control information for making the plurality of logical volumes correspond to regions of the virtual volume, wherein the controller is configured to convert accesses from the upper order apparatus to the virtual volume to accesses to storage regions of the plurality of logical volumes based on the control information, the plurality of logical volumes comprise first logical volumes storing a first type data, second logical volumes storing a second type data, and third logical volumes storing a third type data, the first logical volumes comprise a first online volume for storing online data, and a first active archive volume for storing archive data accessed frequently from the upper order apparatus and a first inactive archive volume for storing archive data accessed less frequently, compared with the data in the first active archive volume, from the upper order apparatus, wherein a storage device of the first inactive archive volume is not capable of rapidly responding to accesses from the upper order apparatus, the data is migrated among the first online volume, the first active archive volume and the first inactive archive volume according to the access frequency of the data in response to receiving a search command for searching data patterns stored in the storage devices designating the virtual volume and the first data type, wherein the controller is configured to:

select the first logical volumes among the plurality of logical volumes;

execute the search command for the first online volume, the first active archive volume and the first inactive archive volume in order; and change the storage device of the first inactive archive volume to be capable of rapidly responding to accesses from the upper order apparatus during the process of searching the first online volume and the first active archive volume.

2. The storage control apparatus according to claim 1, wherein the second logical volumes comprise a pool volume of the storage regions pooled in advance, and when there is a write access from the upper order apparatus to the first logical volume, the controller makes some of the storage regions pooled in advance in the pool volume correlate to the first logical volume, and updates the control information based on this correlation.

3. The storage control apparatus according to claim 2, wherein the controller adds new storage regions of the storage devices to the pool volume.

4. The storage control apparatus according to claim 2, wherein for the storage device to be in an active state is for a power supply of a drive circuit for the storage devices to be in an on state, and for the storage devices to not be in an active state is for a power supply for a drive circuit for the storage devices to be in an off state.

5. The storage control apparatus according to claim 2, wherein an index for the write data is included in a write access from the upper order apparatus, and the controller records the index in the information table for every unit of the storage regions belonging to the pool volume.

6. The storage control apparatus according to claim 5, wherein the controller further comprises a search operation section, wherein the search operation section compares the index contained in a search command from the upper order apparatus and the index recorded in the information table, and carries out data searches based on the search command for units of the storage regions where the latter index corresponding to the former index is set.

7. The storage control apparatus according to claim 6, wherein the search operation section carries out data searches of the second logical volume according to search commands from the upper order apparatus, records history relating to the results of data searches in an information table, recognizes the plurality of indexes contained in new search commands from the upper order apparatus, decides a plurality of correspondence relationships for each index and a number of units of the storage regions set with each index, and executes the search commands for the storage regions contained in the correspondence relationship in the order of correspondence relationships where the number of units is large.

8. The storage control apparatus according to claim 1, wherein information identifying a type of the write data is included in the write access from the upper order apparatus, and the controller determines the type of the write data based on this information, and stores the write data in any of the plurality of second logical volumes in a manner corresponding to the type of the write data.

9. The storage control apparatus according to claim 1, wherein the controller further comprises a search operation section, wherein the search operation section recognizes the type of data constituting a search target according to a search command from the upper order apparatus, and carries out data searches of logical volumes, of the second logical volumes, corresponding to the type of the data.

10. The storage control apparatus according to claim 1, the controller further comprising a search operation section, wherein the search operation section carries out data searches of the second logical volumes according to a search command from the upper order apparatus, records history relating to results of the data searches in an information table, recognizes new search commands from the upper order apparatus, compares the search commands and the information table, decides priority of search areas of the storage regions of the second logical volume, and executes the search commands for search areas using this priority.

11. The storage control circuit according to claim 1, the controller further comprising a search operation section searching the second logical volume based on search commands from the upper order apparatus, and changing this volume to an active state in the event that a target of searching is a volume that is not in an active state based on the search commands.

12. A storage control method for enabling a storage control apparatus to supply storage regions to an upper order apparatus, and for implementing data conversion between the storage regions and the upper order apparatus, the storage control apparatus having a controller to process accesses to the storage regions, a plurality of storage devices on which a plurality of logical volumes are managed thereon by the controller, and a memory for storing control information for making the plurality of logical volumes correspond to regions of the virtual volume, wherein the plurality of logical volumes comprise first logical volumes storing a first type data, second logical volumes storing a second type data, and third logical volumes storing a third type data, wherein the first logical volumes comprise a first online volume for storing online data, and a first active archive volume for storing archive data accessed frequently from the upper order apparatus and a first inactive archive volume for storing archive data accessed less frequently, compared with the data in the first active archive volume, from the upper order apparatus, wherein a storage device of the first inactive archive volume is not capable of rapidly responding to accesses from the upper order apparatus, the data is migrated among the first online volume, the first active archive volume and the first inactive archive volume according to the access frequency of the data in response to receiving a search command for searching data patterns stored in the storage devices designating the virtual volume and the first data type, wherein the method comprises the controller:

providing a virtual volume accessed by the upper order apparatus;

selecting the first logical volumes among the plurality of logical volumes;

executing the search command for the first online volume, the first active archive volume and the first inactive archive volume in order; and changing the storage device of the first inactive archive volume to be capable of rapidly responding to accesses from the upper order apparatus during the process of searching the first online volume and the first active archive volume.

* * * * *